United States Patent [19]

Jorgensen

[11] Patent Number: 5,703,327
[45] Date of Patent: *Dec. 30, 1997

[54] ELECTRICAL BOXES

[75] Inventor: Robert W. Jorgensen, Niles, Mich.

[73] Assignee: Hubbell Incorporated, Orange, Conn.

[21] Appl. No.: 414,493

[22] Filed: Mar. 31, 1995

[*] Notice: The term of this patent shall not extend beyond the expiration date of Pat. No. 5,619,013.

Related U.S. Application Data

[63] Continuation-in-part of Ser. No. 168,377, Dec. 17, 1993, Pat. No. 5,619,013.

[51] Int. Cl.$^6$ .................................................. H02G 3/08
[52] U.S. Cl. ........................ 174/53; 174/57; 220/3.92; 220/3.94
[58] Field of Search ............................. 174/53, 57, 58, 174/48; 220/3.9, 3.92, 3.94, 62.1

[56] References Cited

U.S. PATENT DOCUMENTS

| | | | |
|---|---|---|---|
| 933,661 | 7/1909 | Paiste . | |
| 1,296,811 | 3/1919 | Keller . | |
| 1,483,453 | 2/1924 | Knoderer . | |
| 1,705,768 | 3/1929 | Johnson et al. . | |
| 1,772,313 | 7/1930 | Hoffman . | |
| 1,929,844 | 10/1933 | Haas . | |
| 2,556,061 | 6/1951 | Buckels | 220/3.3 |
| 2,644,600 | 7/1953 | Senif | 220/3.9 |
| 2,782,954 | 2/1957 | Antonucci | 220/3.92 |
| 3,588,019 | 6/1971 | Cozeck | 248/228 |
| 3,834,658 | 9/1974 | Theodorides | 248/205 |
| 4,135,337 | 1/1979 | Medlin | 52/221 |
| 4,140,293 | 2/1979 | Hansen | 248/217.2 |
| 4,263,472 | 4/1981 | Maheu | 174/51 |
| 4,408,695 | 10/1983 | Balkwill et al. | 220/3.3 |
| 4,428,492 | 1/1984 | Jorgensen | 220/3.94 |
| 4,447,030 | 5/1984 | Nattel | 248/27.1 |
| 4,533,060 | 8/1985 | Medlin | 220/3.9 |
| 4,572,391 | 2/1986 | Medlin | 220/3.9 |
| 4,603,789 | 8/1986 | Medlin, Sr. | 220/3.9 |
| 4,844,275 | 7/1989 | Schnell et al. | 220/3.9 |
| 4,880,128 | 11/1989 | Jorgensen | 220/3.9 |
| 5,025,944 | 6/1991 | Rodick | 222/3.94 |
| 5,156,287 | 10/1992 | Zauner | 220/3.92 |
| 5,378,854 | 1/1995 | Hoover | 174/53 |

OTHER PUBLICATIONS

Raco Electrical products Catalog-R-192, 1992, pp. B15-B17.
Thomas & Betts Ad-EC&M, Jun. 1994-p. 67.

Primary Examiner—Kristine L. Kincaid
Assistant Examiner—Paramita Ghosh
Attorney, Agent, or Firm—Jerry M. Presson; David L. Tarnoff; Thomas P. Hilliard

[57] ABSTRACT

An electrical box includes a U-shaped main body and a pair of sidewalls. Each of the sidewalls includes coupling flanges along their transverse edges and along one of their longitudinal edges for overlapping edges of the main body. In some embodiments, the main body has opposite side edges, each side edges having a pair of flanges extending from a midpoint on a rear panel and along the end panels. The flanges on the sidewall are formed to complement the flanges on the main body to overlap with each other in a coupling relation. The main body and sidewalls are formed from a folded blank. The main body is constructed so that a plurality of identical main bodies can be ganged with the flanges of a first main body telescoping with the flanges of a second main body.

21 Claims, 15 Drawing Sheets

ELECTRICAL BOXES

RELATED U.S. PATENT APPLICATION

This application is a continuation-in-part of U.S. patent application Ser. No. 08/168,377, filed Dec. 17, 1993, now U.S. Pat. No. 5,619,013.

FIELD OF THE INVENTION

The present invention is directed to gangable and non-gangable electrical boxes for receiving an electrical receptacle or other electrical device. More particularly, the invention is directed to an electrical box having a main body with a pair of sidewalls coupled together by overlapping and interconnecting flanges for creating either a non-gangable box or a gangable box.

BACKGROUND OF THE INVENTION

Numerous box constructions are known in the art for housing electrical receptacles such as electrical outlets and switches. Many of these boxes are constructed with removable sides so that a plurality of the boxes can be ganged together. Typically, the electrical boxes are coupled together by one or more screws extending through a tab in one box for engaging a screw hole in the adjacent box. This arrangement has the disadvantage in that tabs for receiving the screw usually project outwardly from the side edge of the box. The sidewalls of the box are also secured to the box by the screw and tab arrangement such that the tab protrudes beyond the sidewall of the box. The screw extends through the tab parallel to the sidewall to secure the sidewall to the box. Since the tab extends outwardly from the box and the sidewall, the tab and screw often interfere with the mounting of the box by preventing the box from being mounted flush against a support.

Electrical boxes often have a mounting bracket or other structure for mounting the box on a wall or other support structure. Typically, these mounting brackets are separate elements that are attached to the box by screws or welding. The attachment of the mounting brackets to the box increases the number of parts to be assembled and the final cost of the box. It is important that the box and the mounting structure be manufactured inexpensively and be easy to install.

Electrical boxes are often formed from sheet metal that is folded and fastened together by welding or screws. The mounting bracket is often welded to one side of the box or attached by screws or other fasteners.

A few examples of the previous electrical boxes are disclosed in U.S. Pat. No. 1,705,768 to Johnson et al., U.S. Pat. No. 2,644,600 to Senif, U.S. Pat. No. 3,588,019 to Cozeck et al., U.S. Pat. No. 3,834,658 to Theodorides, U.S. Pat. No. 4,135,337 to Medlin, U.S. Pat. No. 4,140,293 to Hansen, U.S. Pat. No. 4,447,030 to Nattel, U.S. Pat. No. 4,533,060 to Medlin, U.S. Pat. No. 4,572,391 to Medlin, U.S. Pat. No. 4,603,789 to Medlin, Sr., U.S. Pat. No. 4,880,128 to Jorgensen, and U.S. Pat. No. 5,025,944 to Rodick.

In addition, the coupling arrangement of conventional gangable boxes usually protrude from the upper and lower faces of the ganged boxes. These protrusions produce an irregular surface that can be difficult to mount flush on a support surface.

It is apparent from the above that there exists a continuing need in the art for electrical boxes having substantially flush sidewalls to enable the box to be easily mounted flush against a support surface that are inexpensive to manufacture and easy to install. There is further a need for an electrical box that has overlapping areas for joining bodies and sidewalls together to provide improved strength. The overlapped areas also provide a place to spot weld bodies and sidewalls together. This is stronger than projection welding of two abutting edges which do not overlap. This also allows a single gang box to have a larger cubic inch volume (greater width) than a non-overlapping gangable box. Thus, a single gang box with overlapping edges in accordance with the present invention can accommodate a GFI wiring device, while prior boxes with non-overlapping edges are not capable of accommodating a GFI wiring device.

SUMMARY OF THE INVENTION

One object of this invention to produce an electrical box that can readily receive an electrical receptacle and is simple and inexpensive to produce.

A further object of the invention is to provide an electrical box that can be easily assembled with a minimum number of components.

Another object of the invention is to provide an electrical box having removable sidewalls to enable the box to be ganged with an adjacent box.

A further object of the invention is to provide an electrical box having sidewalls attached to a main body by overlapping flanges on the main body and the sidewalls for providing improved strength to the box.

Another object of the invention is to provide an electrical box that is substantially free of projecting tabs or other connecting means to enable the box to be easily mounted flush against a support surface.

Still another object of the invention is to provide an electrical box with a mounting bracket that is inexpensive and simple to manufacture.

A further object of the invention is to provide an assembly of blanks for forming an electrical box.

These and other objects of the invention are basically attained by providing an electrical box assembly, comprising a U-shaped member including a substantially rectangular rear panel with first and second end edges and first and second side edges, a first substantially rectangular end panel having first and second end edges and first and second side edges with the first end edge of the first end panel being rigidly coupled to the first end edge of the rear panel and extending substantially perpendicular to the rear panel, and a second substantially rectangular end panel having first and second end edges and first and second side edges with the first end edge of the second end panel rigidly coupled to the second end edge of the rear panel and extending substantially perpendicular to the rear panel; a first sidewall including a first side panel with first and second end edges and first and second side edges, and being rigidly coupled to the U-shaped member, each of the first and second end edges of the first side panel having a first coupling flange extending substantially perpendicular to the first side panel for overlapping a portion of one of the end panels to attach the first sidewall to the U-shaped member; and a second sidewall including a second side panel with first and second end edges and first and second side edges, and being rigidly coupled to the main body, each of the first and second end edges of the second side panel having a second coupling flange extending substantially perpendicular to the second side panel for overlapping a portion of one of the end panels of the U-shaped member to attach the second sidewall to the U-shaped member.

Other objects, advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
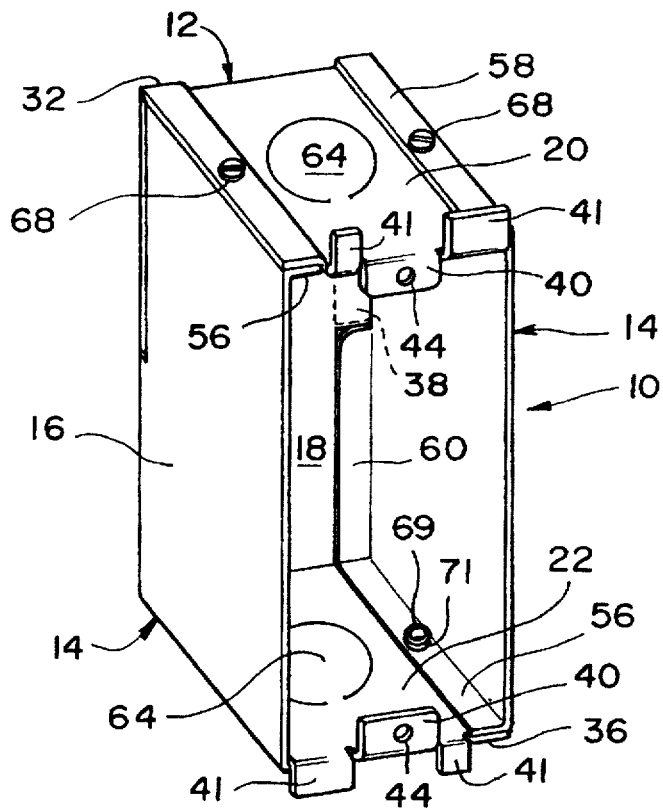
FIG. 1 is a front perspective view of a first embodiment of an assembled electrical box in accordance with the present invention.
Figure 2:
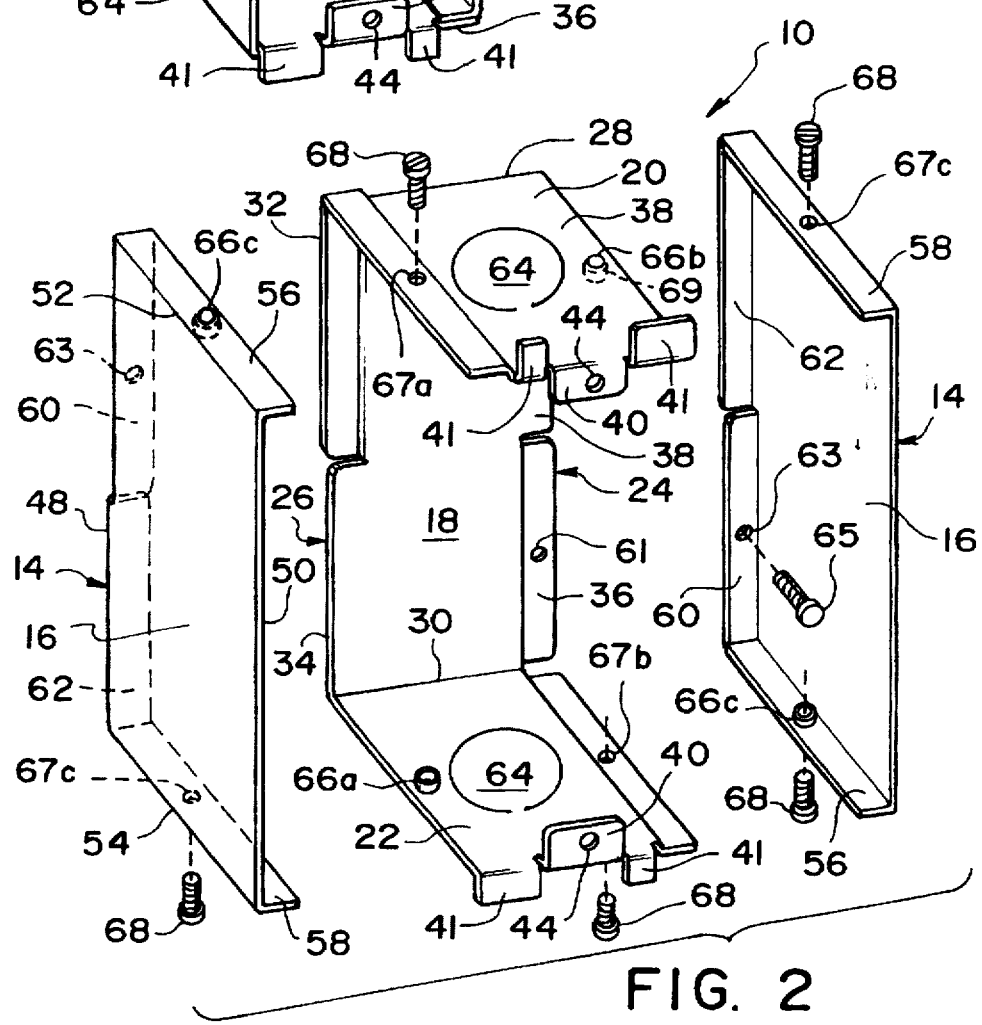
FIG. 2 is an exploded perspective view of the electrical box in accordance with the embodiment of FIG. 1.

Referring to FIGS. 1 and 2, a first embodiment of an electrical box 10 in accordance with the present invention is illustrated, and comprises a main body 12 and a pair of identical sidewalls 14 adapted to be removably coupled to main body 12 to enclose an electrical receptacle or other electrical device mounted in the main body 12. The electrical box 10 is structured for coupling adjacent main bodies 12 together in a ganged fashion. Main body 12 and sidewalls 14 are preferably formed by folding a unitary, one-piece blank of sheet material. In preferred embodiments, the main body 12 and sidewalls 14 are formed from a metallic sheet material such as galvanized steel or aluminum or any other suitable material.

Due to the unique folding pattern electrical box 10, the sheet material used for main body 12 and sidewalls 14 can be thinner than the sheet material used for conventional electrical boxes. In particular, the blank of sheet materials used for electrical box 10 preferably has a thickness of about 0.034" to about 0.039", while conventional electrical boxes have a thickness of about 0.0625". Also a plurality of conventional break-out windows and/or auxiliary holes can be stamped into the blanks of sheet material for the main body 12 and the sidewalls as needed or desired.

Figure 10:
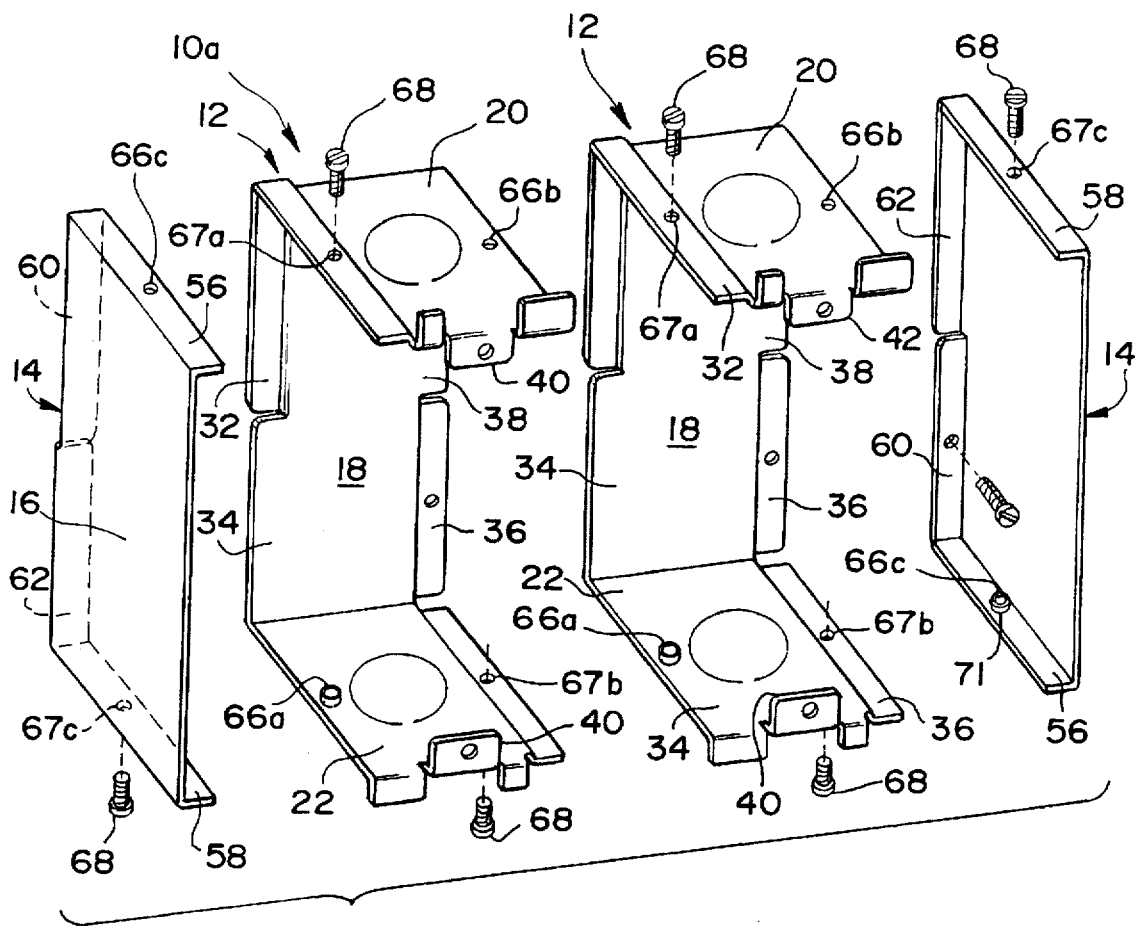
FIG. 10 is an exploded perspective view of a ganged electrical box in accordance with an alternative embodiment of the invention.

Main body 12, as shown in FIGS. 1 and 2, is bent to form a substantially U-shape body member having a substantially planar rear panel 18, a first end panel 20 shown as a substantially planar top wall, and a second end panel 22 shown as a substantially planar bottom wall. Rear panel 18 has a substantially rectangular shape defining opposite side edges 24 and 26 and transverse end edges 28 and 30. End panels 20 and 22 are coupled to transverse end edges 28 and 30 respectively of rear panel 18 by fold lines and are disposed substantially perpendicular to the plane of rear panel 18. The side edges of the end panels 20 and 22 together with the side edges 24 and 26 of the rear panel 18 define the two opposite side edges of main body 12 which are coupled to the pair of sidewalls 14. In alternative embodiments as discussed hereinafter in greater detail, main body 12 can be coupled to an adjacent main body as shown in FIG. 10 or to a main body with a bracket 110 shown in FIG. 13.

As viewed in FIG. 2, the left side of main body 12 has a first flange 32 and second flange 34. In the embodiment shown in FIG. 2, each of flanges 32 and 34 begins from a midpoint on side edge 26 of rear panel 18 and extends continuously along end panels 20 and 22, respectively. The right side of main body 12, as viewed in FIG. 2, has first and second flanges 36 and 38 extending along the side edges thereof. Similarly, flanges 36 and 38 begin from a midpoint on side edge 24 and extend continuously along end panels 20 and 22, respectively. As shown in FIG. 2, each of the flanges 32,34,36 and 38 have a substantially L-shape when viewed in side elevation for engaging sidewalls 14 as discussed hereinafter in greater detail.

Flanges 32 and 36 are formed to have a shape complementing the shape of the rear panel 18 and the respective end panel 20 or 22 and to be spaced slightly outward from the plane of the rear panel 18 and end panels 20 and 22. In preferred embodiments, flanges 32 and 36 are spaced from the plane of the rear panel 18 and end panels 20 and 22 by a distance of about the thickness of the sheet material from which the electrical box is made as discussed hereinafter in greater detail.

Flanges 34 and 38 preferably have a shape complementing the shape of rear panel 18 and end panels 20 and 22 and are disposed in the same plane as the rear panel 18 and its respective end panel 20 or 22. As shown in FIGS. 1 and 2, flanges 32 and 36 are positioned along opposite sides and opposite ends of the main body, i.e., diagonally opposite each other, so that the main body is symmetrical. In alternative embodiments, the flanges may extend only partially the length of the panels.

A mounting tab 40 also extends from the front edges of top and bottom end panels 20 and 22 for mounting an electrical device to the electrical box 10. Tabs 40 extend inwardly toward the center of main body 12 substantially parallel with rear panel 18. Each of the tabs 40 includes a threaded hole 44 for receiving a screw or other fastener for attaching an electrical device to the main body 12 in a conventional manner. Alternatively, holes 44 can be punched holes for accommodating self-threading screws.

A pair of plaster ears 41 extend from the front edge of each of the first and second end panels 20 and 22. Ears 41 are positioned on opposite sides of tabs 40 and extend outwardly from main body 12 substantially parallel to rear panel 18. Ears 41 are dimensioned for mounting electrical box 10 within an existing wall and in particular a plasterboard wall such that ears 41 lie flat against the exterior surface of the wall (not shown). Each ear 41 may include an optional hole for receiving a screw or other fastener for securing electrical box 10 to the wall.

Each sidewall 14 is substantially identical to each other so that they can be attached to either side of main body 12. Each of the sidewalls 14 has a substantially rectangular shaped side panel 16 complementing the sides of main body 12 defining longitudinal edges 48 and 50 and transverse edges 52 and 54. Each transverse edge 52 and 54 has a flange 56 and 58, respectively, extending substantially perpendicular to the plane of side panel 16. Rear longitudinal edge 48 also has a pair of substantially parallel flanges 60 and 62 extending substantially perpendicular to the plane of the side panel 16. Flange 62 is substantially parallel to flange 60 and spaced outwardly from flange 60 by a distance substantially equal to the thickness of the sheet material. Flanges 56 and 58 are coupled along the edges 52 and 54 of side panel 16, respectively, by fold lines. Flanges 60 and 62 are coupled along offset edge 48 of side panel 16 so that flanges 60 and 62 are offset from each other.

In preferred embodiments, at least one knock-out 64 is provided in one or more of the panels of the main body 12 or sidewalls 14 to allow suitable electrical connections to an electrical device mounted in the electrical box 10. In the embodiment shown in FIGS. 1 and 2, knock-outs 64 are provided in end panels 20 and 22 of main body 12. Of course, in alternative embodiments, the knock-outs may be in the sidewalls 14 or rear panel 18 or any combination thereof. In further embodiments, pry-outs for one or more cables may be included instead of or in addition to the knock-outs.

The electrical box 10 is assembled by coupling sidewalls 14 to main body 12. Specifically, as seen in FIG. 1, flanges 32,34,36 and 38 on main body 12 and flanges 56,58,60 and 62 of each of sidewalls 14 are arranged to overlap each other in a coupling relationship. As also seen in FIG. 1, flange 56 on the transverse edge 52 of each of the sidewalls 14 and flange 60 on the longitudinal edge 48 of each of the sidewalls 14 are adapted to fit inside and overlap with flanges 32 and 36 of main body 12. Flange 62 on the longitudinal edge 48 of each of the sidewalls 14 and flange 58 on the transverse edge 54 of each of the sidewalls 14 fit outside and overlap with flanges 34 and 38 of main body 12. Accordingly, flanges 56 and 60 of sidewalls 14 overlap inside surface of flanges 32 and 36 while flanges 58 and 62 of sidewalls 14 overlap outside surface of flanges 34 and 38.

Sidewalls 14 are fixedly secured to main body 12 by a plurality of screws or threaded fasteners 68. In particular, flange 38 on top end panel 20 of main body 12, and flange 34 on bottom end panel 22 each have a threaded hole 66a and 66b, respectively, for threadedly receiving one of the screws 68. Alternatively, holes 66a and 66b could be unthreaded and receive thread cutter screws which will thread holes 66a and 66b during assembly. Holes 66a and 66b are preferably extruded to form elongated holes with collars so that holes 66a and 66b can have more threads than conventional punched holes. Flanges 32 and 36 along top and bottom end panels 20 and 22, respectively, include a punched hole 67a and 67b, respectively, to allow screws 68 to pass therethrough. Flange 56 of sidewall 14 also includes a threaded, extruded hole 66c having a threaded collar to receive one of the screws 68 when hole 66c is aligned with hole 67a of main body 12. Flange 58 of sidewall 14 includes a punched hole 67c to allow one of the screws 68 to pass therethrough. When assembled, screws 68 pass through the punched holes 67a and 67b in flanges 32 and 36, respectively, and into the threaded holes 66c of flanges 56 of the two sidewalls 14. Likewise, screws 68 also pass through punched holes 67c in flanges 58 of sidewalls 14 and into threaded hole 66a and 66b of flanges 34 and 38, respectively.

Referring to FIG. 2, a threaded hole 61 may be included in one or more of the flanges of the rear panel 18 and another threaded hole 63 may be included in one of the flanges of the sidewalls 14 to receive a ground screw 65 for connecting a ground wire (not shown). Specifically, the electrical box 10 may include a threaded hole 61 in flange 36 and a threaded hole 63 in flange 60 aligned with hole 61 for receiving a screw 65 for connecting a ground wire. By threading screw 65 through both flanges 36 and 60, a sufficient thickness is provided to ensure screw 65 will engage at least two full threads at a thirty-two threads per inch pitch without the need for extruding a ground hole or providing thicker material for the electrical box 10. Alternatively, holes 61 and 63 could be unthreaded for receiving a thread cutter or self tapping ground screw.

The assembly of sidewalls 14 to main body 12 in this embodiment have outer sidewall surfaces that are substantially flush with no protrusions. In this manner, the electrical box 10 can be easily mounted flush with a support surface. The upper and lower surfaces of the electrical box are also sufficiently smooth to allow easy mounting of the assembly. In this embodiment, the screw heads in the end panels slide past the wallboard into an empty wall cavity.

An advantageous feature of the invention is the ability of the flanges of the main body to overlap with flanges of an adjacent main body in a telescoping fashion. In this manner, the spacing between adjacent electrical devices in a ganged assembly is less than the width of a single electrical box. In preferred embodiments, the single electrical box is about 2 3/16 inches wide to easily accommodate wide electrical devices such as G.F.I. devices in comparison to conventional boxes having a width of 1 13/16 inch. In a multiganged assembly, the spacing between the electrical device and the sidewall remain unchanged from the spacing in a single box. The coupling flanges telescope with the flanges of an adjacent main body a distance such that the spacing between adjacent electrical devices of the ganged assembly is substantially the same as the spacing in conventional ganged boxes. In preferred embodiments, the coupling flanges of the adjacent main bodies overlap about 1/8 inch so that the spacing between adjacent electrical devices is about 1 13/16 inch.

Flange 32 is spaced away from the plane of the panel 20 by a distance proximating the thickness of the material of the electrical box 10 such that the flange 32 lies in substantially the same plane as flange 58 on the opposite sidewall 14. The overlapping flanges of main body 12 and sidewalls 14 also provide added strength to the assembled electrical box 10. The double thickness of material in the corners of the box 10 resist crushing or bending during installation of the electrical box 10. In the illustrated embodiment, the overlapping flanges extend substantially the full length of the panels making up the electrical box 10. In alternative embodiments, the overlapping flanges may extend only along a portion of the panels.

Holes 66a, 67a, 66b and 67b and screws 68 are shown in FIGS. 1–4 as being substantially centered in the flanges so that screws 68 are axially aligned. In alternative embodiments, the screws and holes may be arranged such that the axes of the screws in upper end panel 20 are spaced apart from the axes of the screws in bottom end panel 22. Moreover, one or more screws may also extend through the overlapping flanges on rear panel 18 and the respective overlapping flanges on the sidewalls 14 to resist relative movement between sidewalls 14 and main body 12.

Figure 3:
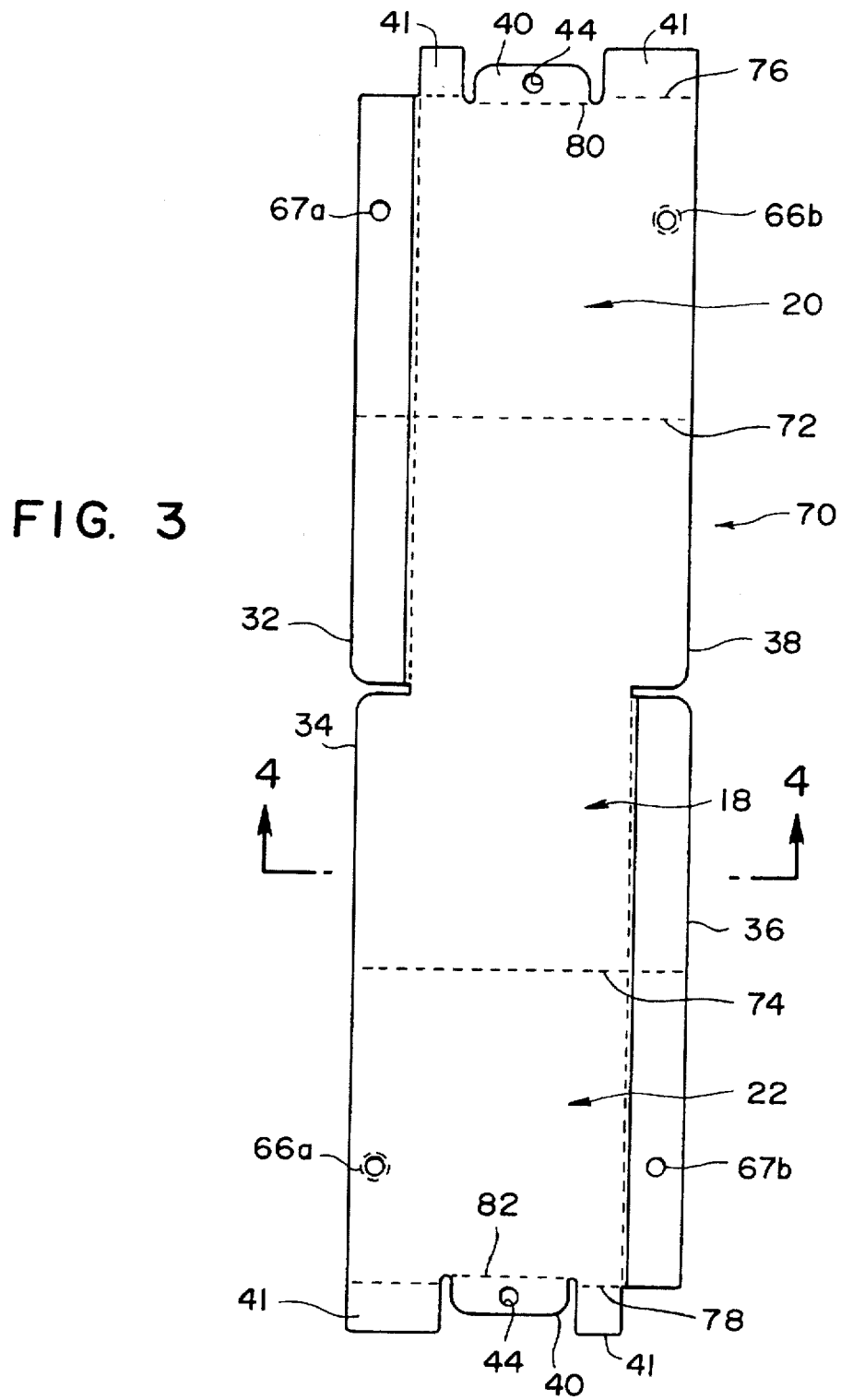
FIG. 3 is a top plan view of the blank of the main body shown in FIGS. 1–2 after forming the interlocking tabs and prior to folding the end panels in accordance with the invention.
Figure 7:
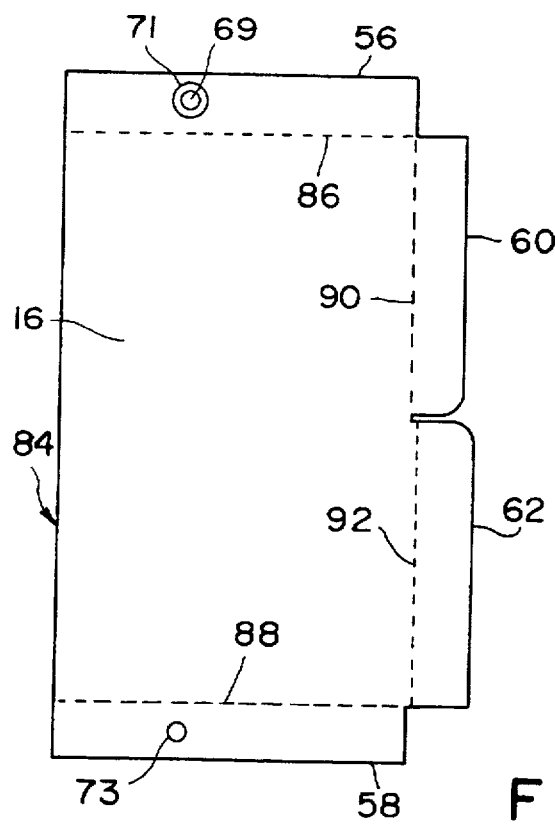
FIG. 7 is a top plan view of a blank of the sidewalls for the main body in accordance with a preferred embodiment of the invention.
Figure 8:
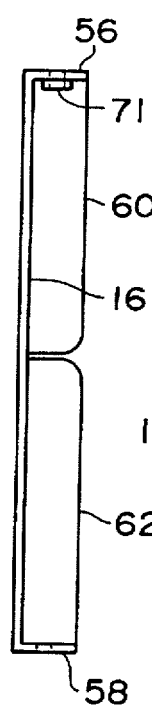
FIG. 8 is a front elevational view of one sidewall formed from folding the blank of FIG. 7.

Referring to FIGS. 3 and 7, main body 12 and sidewalls 14 are preferably formed from blanks of metal or other suitable rigid material. Specifically, the main body 12 is formed from a stamped blank 70 having a substantially rectangular shape as seen in FIG. 3, while sidewalls 14 are formed from blanks 84 as seen in FIG. 7.

Blank 70 includes rear panel 18 and end panels 20 and 22 connected together along fold lines 72 and 74. Flanges 32 and 38 extend from about the midpoint of the blank 70 to the end 76 of blank 70. Flanges 34 and 36 extend from a midpoint of blank 70 to end 78. One of the tabs 40 extends from each of the ends 76 and 78 and are coupled thereto by fold lines 80 and 82, respectively.

Figure 4:
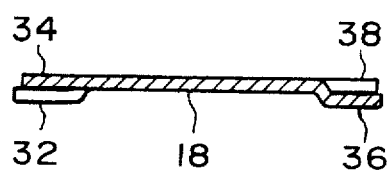
FIG. 4 is a transverse cross-sectional view of the main body taken along line 4—4 of FIG. 3.

Referring to FIG. 4, each of the flanges 34 and 38 has a first portion disposed in the same plane as rear panel 18 and a second portion disposed in the same plane as its respective end panel 20 or 22. Each of the flanges 32 and 36, on the other hand, is formed or offset bent to have a first portion substantially parallel to rear panel 18 and a second portion substantially parallel to its respective end panel 20 or 22. Flanges 32 and 36 are spaced from the planes of the rear panel 18 and its respective end panel 20 or 22 by a distance substantially equal to the thickness of the sheet material.

Figure 5:
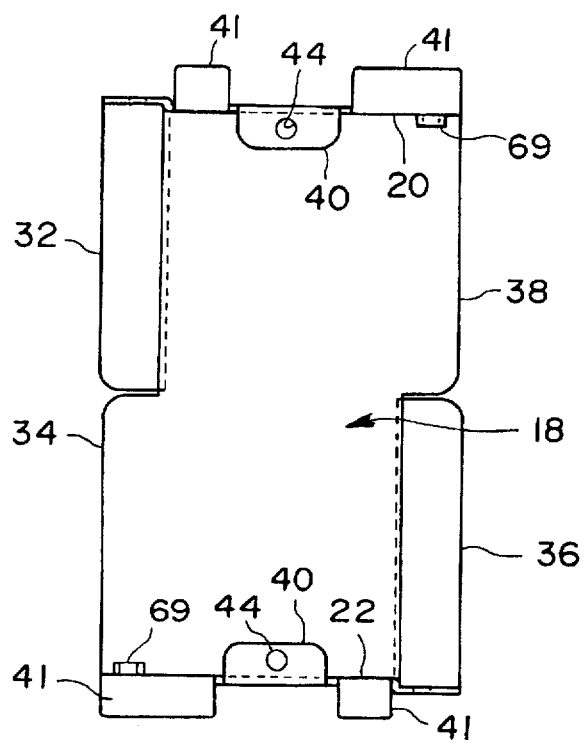
FIG. 5 is a front elevational view of the main body formed from completely folding the blank of FIG. 3 in accordance with the present invention.
Figure 6:
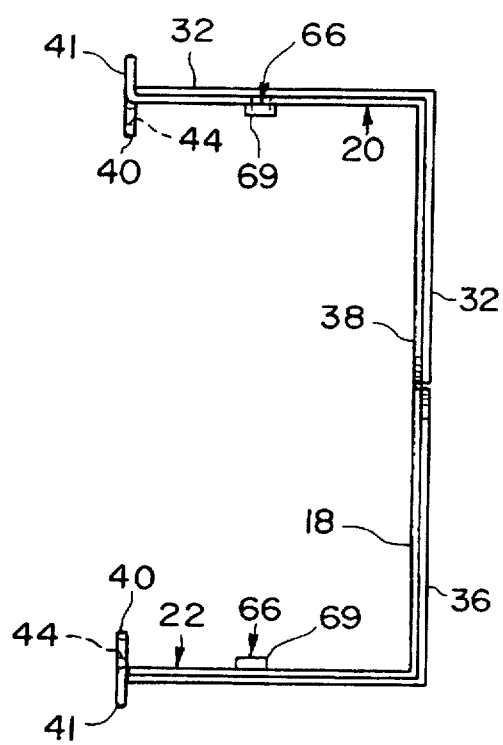
FIG. 6 is a right side elevational view of the main body of the embodiment of FIG. 5.

Main body 12 is formed by folding end panels 20 and 22 along fold lines 72 and 74 to a right angle with respect to rear panel 18 as shown in FIGS. 5 and 6. Blank 70 is folded so that the flanges 32 and 36 are in a plane spaced outward from the interior of the main body 12. Tab 40 is then folded inwardly along fold lines 80 and 82 so that the tab 40 is essentially at right angles to the respective end panels 20 and 22 and parallel to the rear panel 18.

In the embodiment of FIGS. 1–11, flanges 32 and 36 are wider than the flanges 34 and 38. The difference in width between flanges 32 and 36 and flanges 34 and 38 is approximately the thickness of the sheet material from which blank 70 is made. As shown in FIG. 4 and FIG. 6, the portion of flange 36 extending along rear panel 18 is parallel to the portion of flange 38 extending along rear panel 18 and spaced apart a distance equal to the thickness of the sheet material. Ears 41 are folded outwardly perpendicular to end panels 20 and 22.

Each of the sidewalls 14 is substantially identical and interchangeable. Thus, each of the sidewalls 14 can be coupled to either side of main body 12. Referring to FIG. 7, sidewalls 14 are formed from a blank 84 preferably made from the same sheet material used for main body 12. Blank 84 is formed to include a rectangular side panel 16 with end flanges 56 and 58 connected to panel 16 along fold lines 86 and 88, respectively, and flanges 60 and 62 attached to side panel 16 along fold lines 90 and 92, respectively. As shown in FIG. 7, flange 62 is wider than flange 60 by about the thickness of the sheet material of the blank 84. Fold line 92 is also spaced slightly outward from the fold line 90 a distance substantially equal to the sheet material thickness.

Figure 9:
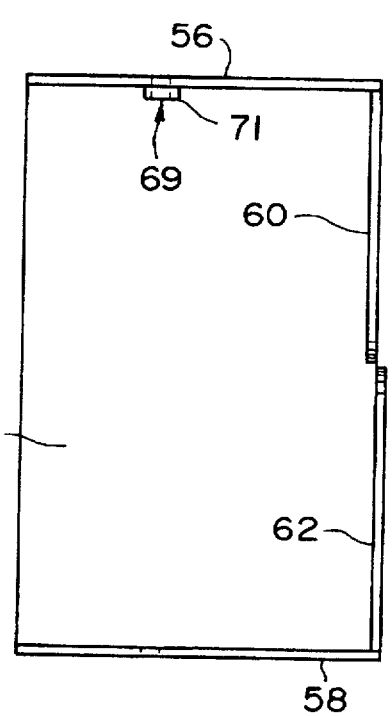
FIG. 9 is a right side elevational view of the sidewall formed from folding the blank of FIG. 7.

Blank 84 is formed into sidewall 14 by folding flanges 56 and 58 inwardly to form substantially right angles with side panel 16. Flanges 60 and 62 are also folded inwardly to form substantially right angles with side panel 16. The spacing between the fold lines 90 and 92 of flanges 60 and 62 produce the same spacing between the flanges 60 and 62 when folded as shown in FIG. 9. As shown in the front view of FIG. 8, flanges 58 and 62 are slightly longer than flanges 56 and 60. In alternative embodiments, each of the flanges may be the same dimension.

As shown in FIG. 1, the flanges 56 and 60 of the sidewall 14 overlap with flanges 32 and 36 of main body 12 on the interior surface of the main body 12. Flanges 56 and 60 are preferably slightly narrower than flanges 32 and 36 so that when assembled, the edges of flanges 32 and 36 are substantially flush with the outer surfaces of side panels 16.

Figure 11:
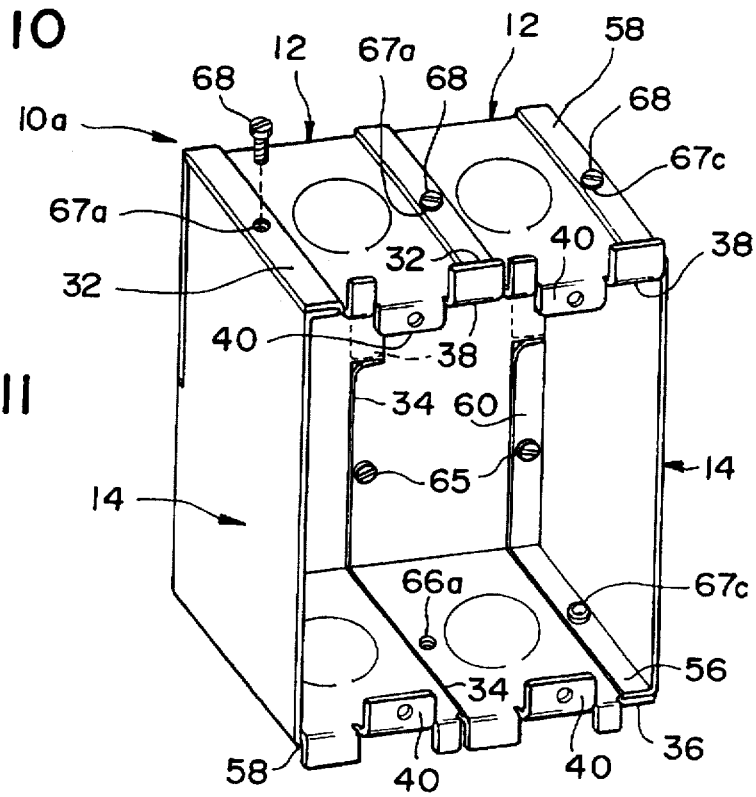
FIG. 11 is a perspective view of the ganged electrical box of FIG. 10 in an assembled condition.

Electrical Box 10a of FIGS. 10 and 11

A particularly advantageous feature of main body 12 is the ability to be coupled to an adjacent identical main body 12 in a ganged fashion to form a two ganged electrical box 10a as shown in FIGS. 10 and 11. Of course, any number of main bodies 12 may be coupled together with sidewall 14 at each end. The ganged electrical box 10a is constructed from two identical main bodies 12 and two identical sidewalls 14. The structural features of the main bodies 12 and sidewalls 14 are substantially the same as in the embodiment of FIGS. 1–9. Thus, similar elements are identified by like reference numbers.

Referring to FIGS. 10 and 11, two adjacent main bodies 12 are coupled together by overlapping flanges 36 and 38 of first main body 12 with flanges 32 and 34 of a second adjacent main body 12. A screw 68 is threaded through the holes 66 in the flanges of main bodies 12 to rigidly couple the two main bodies 12 together. Sidewalls 14 are attached to the open ends of the ganged main bodies 12 by overlapping the flanges 32 and 34 of the left main body 12 and the flanges 36 and 38 of the right main body 12 with the flanges 60 and 62 on the respective sidewalls 14 as shown in FIG. 11. Screws 68 are threaded through the holes 66 and 67 to rigidly couple the sidewalls 14 to the respective main bodies 12.

Main bodies 12 have a width capable of accommodating conventional electrical devices. The interlocking flanges of main body 12 overlap with the interlocking flanges on the adjacent main body 12 as shown in FIG. 11 by a distance to provide a rigid connection therebetween, while maintaining proper spacing between ganged electrical devices. In preferred embodiments, each of the main bodies 12 has a width of 2³⁄₁₆ inches with the flanges being ⅜ inch wide. This provides an electrical box 10a having a width to accommodate a single electrical device when two sidewalls 14 are coupled to opposite sides of the main body 12. When two or more main bodies 12 are ganged, the flanges coupling the main bodies 12 together overlap by approximately ⅜ inch to maintain minimum spacing of adjacent electrical devices at approximately 1¹³⁄₁₆ inches. This spacing is sufficient to accommodate ganged electrical devices. Accordingly, the main body 12 is constructed to provide sufficient dimensions for a single electrical device and can be ganged to accommodate a plurality of electrical devices without making the ganged assembly unnecessarily large.

Embodiment of FIGS. 12–15

Figure 12:
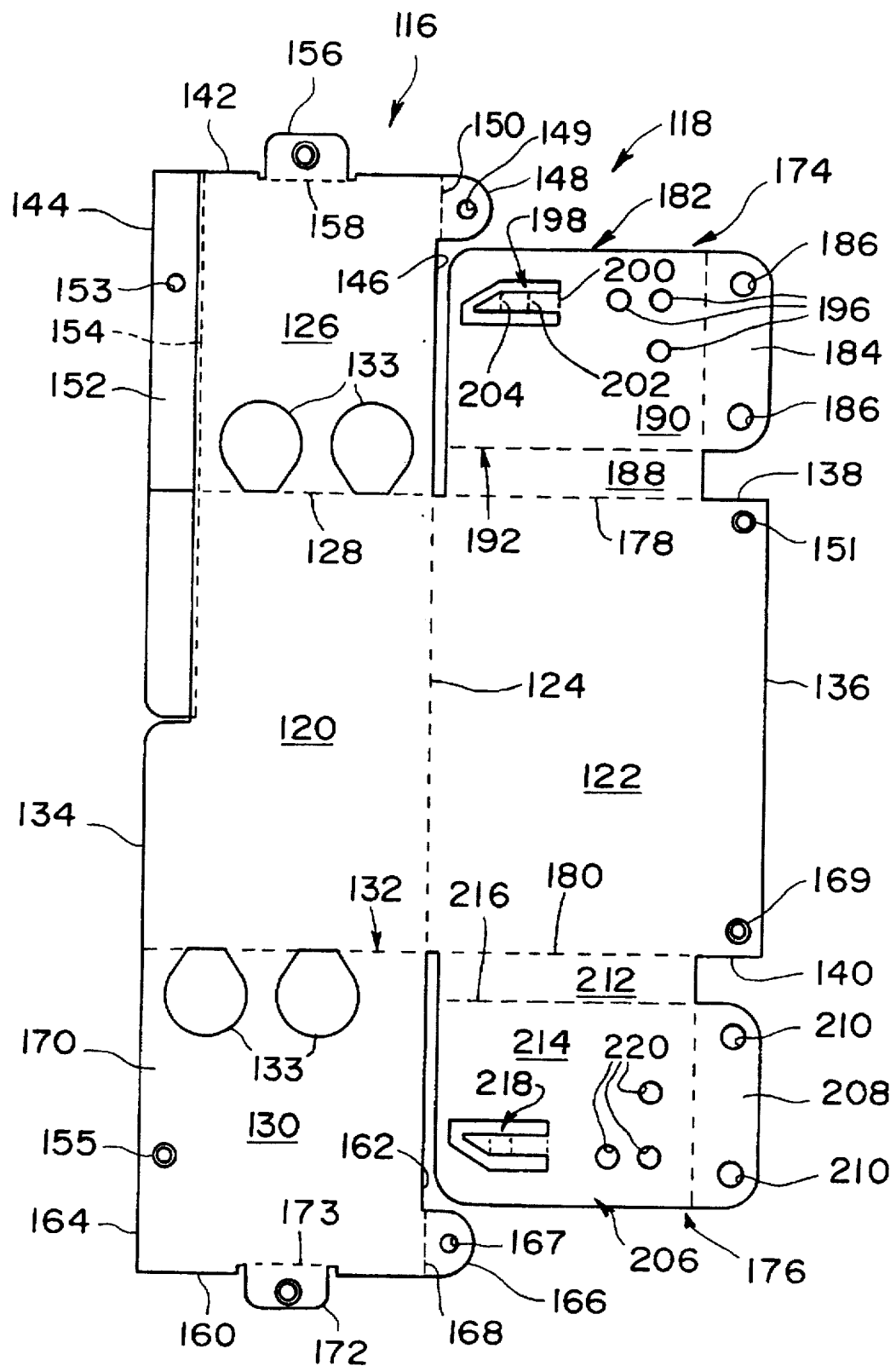
FIG. 12 is a top plan view of a blank for forming a portion of an electrical box in an alternative embodiment of the invention.
Figure 13:
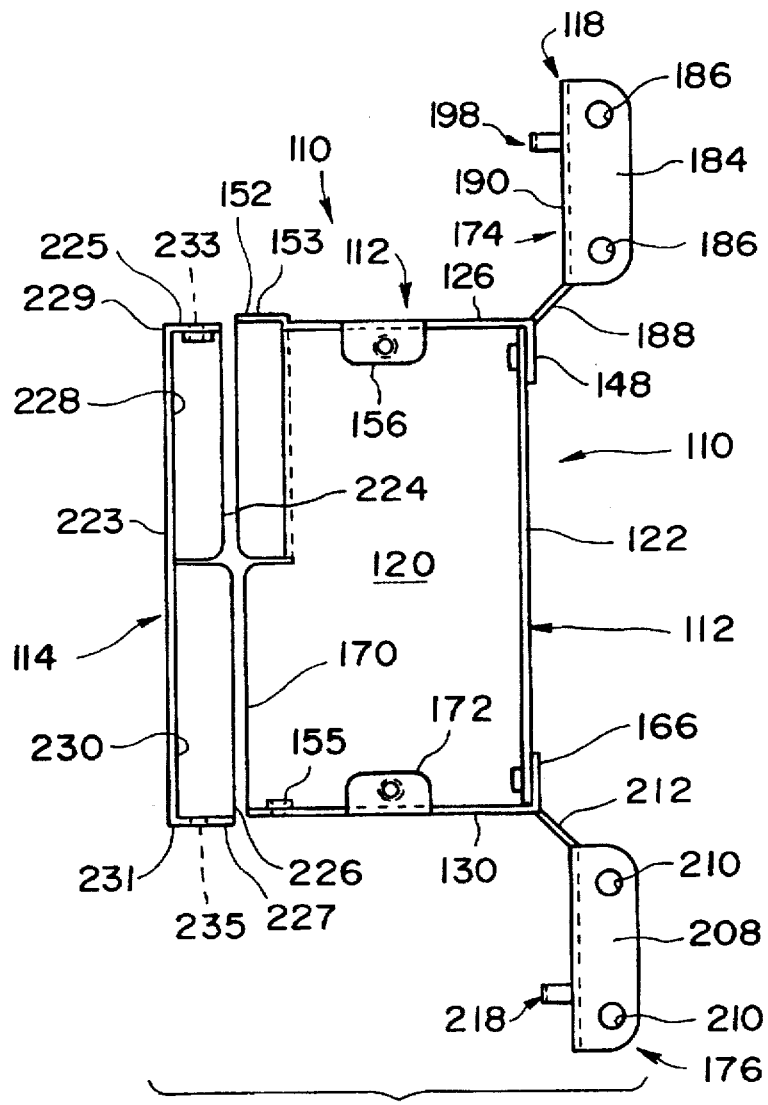
FIG. 13 is an exploded front elevational view of an electrical box formed from folding the blank of FIG. 12 to form a main body with a bracket and coupling the main body to a removable sidewall which can be the same sidewall as the first embodiment.

In the embodiment illustrated in FIGS. 12–15, an electrical box 110 is formed from a main body 112 and a sidewall 114. Main body 112 is formed from a unitary blank 116 of sheet material as shown in FIG. 12. Sidewall 114 is substantially identical to sidewalls 14 of the embodiment of FIGS. 1–11 as previously discussed. Thus, sidewall 114 will not be discussed in detail. As seen in FIG. 13, when blank 116 is folded, main body 112 is formed with an integral mounting bracket 118.

The main body 112 of electrical box 110 includes a rear wall panel 120, a sidewall portion or panel 122 coupled to rear wall panel 120 by a fold line 124, a first end wall panel 126 coupled to rear wall panel 120 by fold line 128, and a second end wall panel 130 coupled to rear wall panel 120 by fold line 132. Knock-out or pry-out members 133 are provided in end wall panels 126 and 130.

As illustrated in FIG. 13, electrical box 110 forms a two and one-half (2½) inch deep single gangable electrical box. It is apparent to those skilled in the art that electrical box 110 can have a variety of shapes or sizes without departing from the invention. Rear wall panel 120, first sidewall panel 122 and end panels 126 and 130 are substantially planar members. Fold lines 128 and 132 are substantially parallel and form a pair of opposite edges of rear wall panel 120. Fold line 124 and edge 134 form the second pair of opposite edges of rear wall panel 120.

Sidewall panel 122 has a free edge 136 which is substantially parallel to the edge formed by first fold line 124, and a pair of opposite, parallel edges 138 and 140 extending perpendicularly between free edge 136 and fold line 124. Edges 138 and 140 are substantially aligned with fold lines 128 and 132, respectively. When main body 112 is folded, sidewall panel 122 is bent along fold line 124 to extend substantially perpendicular to rear wall panel 120.

First end wall panel 126 has a substantially flat, planar, rectangular shape, and includes a first pair of opposite, parallel edges formed by fold line 128 and free edge 142. End wall panel 126 further includes a second pair of opposite, parallel free edges 144 and 146. A first coupling flap 148 is coupled to first end wall panel 126 by a fold line 150 for engaging the exterior surface of first sidewall panel 122. A flange 152 is coupled to first end wall panel 126 and rear panel 120 by fold line 154. A wiring device mounting flange 156 is coupled to first end wall panel 126 by fold line 158 for attaching a wiring device (not shown) to main body 112. When blank 116 is folded, first end wall panel 126 is bent along fold line 128 to extend substantially perpendicular to rear wall panel 120 and flange 152 is folded to be spaced outwardly from main body 112 as shown in FIG. 13. Flange 152 is shaped to overlap and couple to sidewall 114.

First coupling flap 148 is a substantially flat, planar half circular member. When first coupling flap 148 is folded along fold line 150, coupling flap 148 extends substantially parallel to sidewall panel 122 and perpendicular to end wall 126 for engaging the exterior surface of sidewall panel 122. Accordingly, coupling flap 148 holds first end wall panel 126 substantially perpendicular to first sidewall panel 122, and provides rigidity to assembly 110. Fold line 150 is substantially parallel to edge 146 of first end wall panel 126 and spaced approximately the thickness of first sidewall panel 122 from edge 146. Fold line 150 is also substantially parallel to fold line 154. Coupling flap 148 includes a hole 149 to align with a hole 151 in sidewall panel 122 to receive an optional fastener (not shown).

Flange 152 is substantially the same as the overlapping flanges in the embodiment of FIGS. 1–4. In the embodiment illustrated, flange 152 extends the length of end panel 126 and about one-half the length of rear wall panel 120. Flange 152 forms a portion of rear wall panel 120 and end panel 126 and is spaced outwardly about the thickness of the sheet material. A punched hole 153 is provided in flange 152 to receive a fastener (not shown) to couple flange 152 to sidewall 114.

Figure 14:
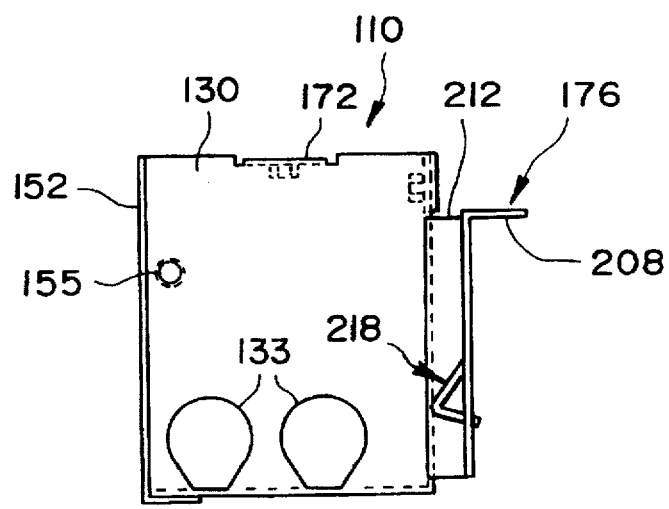
FIG. 14 is a bottom plan view of the electrical box illustrated in FIG. 13 without the sidewall.

Second end wall panel 130 has a substantially flat, planar, rectangular shape having a first pair of opposite, parallel edges formed by fold line 132 and free edge 160 together with free side edges 162 and 164. A first coupling flap 166 is coupled to second end wall panel 130 by a fold line 168 for the exterior surface of engaging sidewall panel 122. A flange 170 is formed from portions of second end wall panel 130 and rear panel 120 for engaging sidewall 114. Unlike flange 152, flange 170 lies in the same plane as end wall panel 130 and rear wall panel 120. A wiring device mounting flange 172 is coupled to second end wall panel 130 by fold line 173 for attaching a wiring device (not shown) to main body 112. When blank 116 is folded, second end wall panel 130 is bent along fold line 132 to extend substantially perpendicular to rear wall panel 120, and flap 166 and flange 172 are bent along their fold lines to extend substantially perpendicular to second end wall panel 130 as seen in FIGS. 13 and 14.

First coupling flap 166 is a substantially flat, planar half circular member. When first coupling flap 166 is folded along fold line 168, coupling flap 166 extends substantially perpendicular to second end wall panel 130 for engaging the exterior surface of first sidewall panel 122. Accordingly, coupling flap 166 holds second end wall panel 130 substantially perpendicular to first sidewall panel 122, and provides rigidity to electrical box 112. Fold line 168 is substantially parallel to edge 162 of second end wall panel 130 and spaced approximately the thickness of first sidewall panel 122 from edge 162. Fold line 168 is also substantially parallel to edge 164. Coupling flap 166 includes a hole 167 for aligning with a hole 169 in side panel 122 to receive an optional fastener (not shown).

Bracket 118 includes a first bracket portion 174 and a second bracket portion 176 integrally formed with first sidewall panel 122. First bracket portion 174 is coupled to first sidewall panel 122 by fold line 178 which lies on edge 138 of sidewall panel 122. Second bracket portion 176 is coupled to sidewall panel 122 by fold line 180 which lies on edge 140 of sidewall panel 122. When folded, bracket portions 174 and 176 are preferably spaced one-half inch from edge 136 of sidewall panel 122 so that electrical box 110 is flush with one-half inch drywall when coupled to a support member. An extruded hole 155 is provided in flange 170 to receive a threaded screw. As before, extruding hole 155 is optional.

Figure 15:
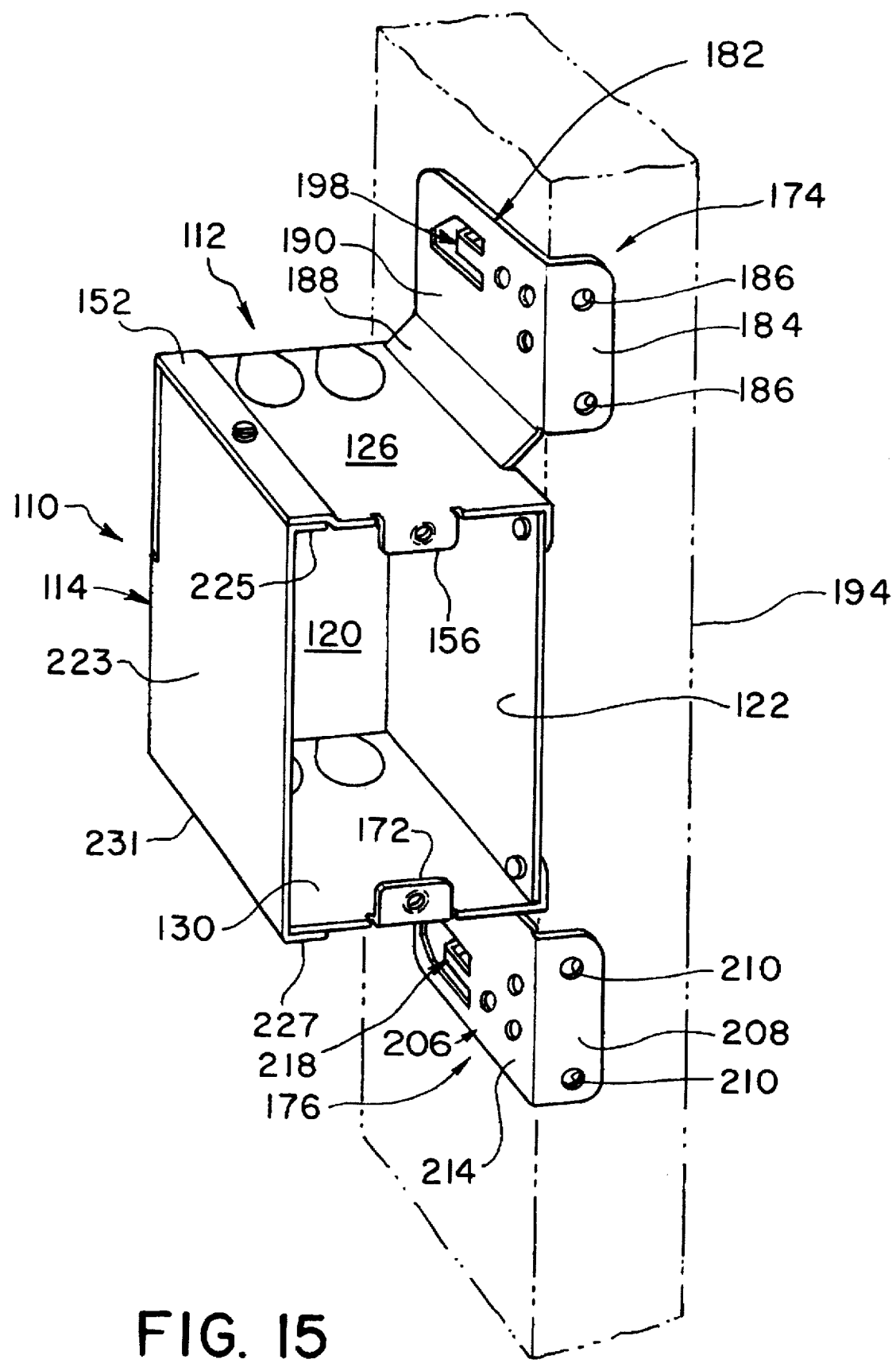
FIG. 15 is a perspective view of the electrical box illustrated in FIGS. 13 and 14 after being assembled and mounted to a support member.

First bracket portion 174 includes a first side mounting section 182, and a face mounting section 184 with a pair of mounting holes 186 for receiving fasteners therein. Side mounting section 182 includes a first portion 188 and a second portion 190 coupled to first portion 188 by fold line 192. First portion 188 is substantially rectangular and extends outwardly from sidewall panel 122 at approximately a forty-five degree angle. Second portion 190 extends outwardly from first portion 188 and is substantially parallel to sidewall panel 122. Accordingly, side mounting section 182 spaces sidewall panel 122 from support member 194 as seen in FIG. 15.

Mounting portion 190 includes holes 196 for mounting bracket 174 to a support 194 by nails, screws or any other fasteners. A punch member 198 is also formed in portion 190 and connected thereto along fold line 200. Punch member 198 is folded in half along fold line 202 to define a leg 204 which is nailed into wood support 194 in a conventional manner as shown in FIG. 15. When the electrical box is mounted to a metal stud, the leg 204 is not nailed into the stud.

Second bracket portion 176 includes a first side mounting section 206, a face mounting section 208 with a pair of mounting holes 210 for receiving fasteners therein. Side mounting section 206 includes a first portion 212 and a second portion 214 coupled to first portion 212 by fold line 216. First portion 212 is substantially rectangular and extends outwardly from sidewall panel 122 at approximately a forty-five degree angle. Second portion 214 extends outwardly from first portion 212 and is substantially parallel to sidewall panel 122. Accordingly, side mounting section 176 spaces sidewall panel 122 from the support member 194 as seen in FIG. 15. A punch member 218 similar to punch 198 is also formed in portion 214 for engaging support 194 along with holes 220 for receiving conventional fasteners therein.

Sidewall 114 is also formed from a blank similar to the sidewall of the embodiments of FIGS. 1–11. Sidewall 114 includes a side panel 223 having end flanges 224 and 226 coupled thereto along fold lines 228 and 230, respectively. As in the previous embodiment, flange 224 is in a plane spaced from the plane of flange 226 by a distance equal to the thickness of the sheet material. End flanges 225 and 227 are coupled to side panel 223 along fold lines 229 and 231, respectively. Flange 225 includes a hole 233 for aligning with hole 153 in main body 112 to receive fasteners (not shown) for coupling sidewall 114 to main body 112. Flange 227 includes a punched hole 235 for aligning with extruded hole 155 and to receive a suitable screw. Holes 155 and 233 can be either extruded (as shown) or punched, as well as either threaded or subsequently threaded by self-threading screws.

Referring to FIGS. 13 and 14, main body 112 is constructed by folding blank 116 along the fold lines discussed above. Electrical box 110 is formed by coupling to sidewall 114 to main body 112 as previously discussed by overlapping the flanges on sidewall 114 with the flanges on main body 112. Alternatively, main body 112 may also be coupled to an identical main body 112 or to main body 12 which is substantially identical to the embodiment of FIGS. 1–11. In this manner, the elements can be ganged together to form the desired size of the assembly. Electrical Boxes 110a and 110b of FIGS. 16 and 17

Figure 16:
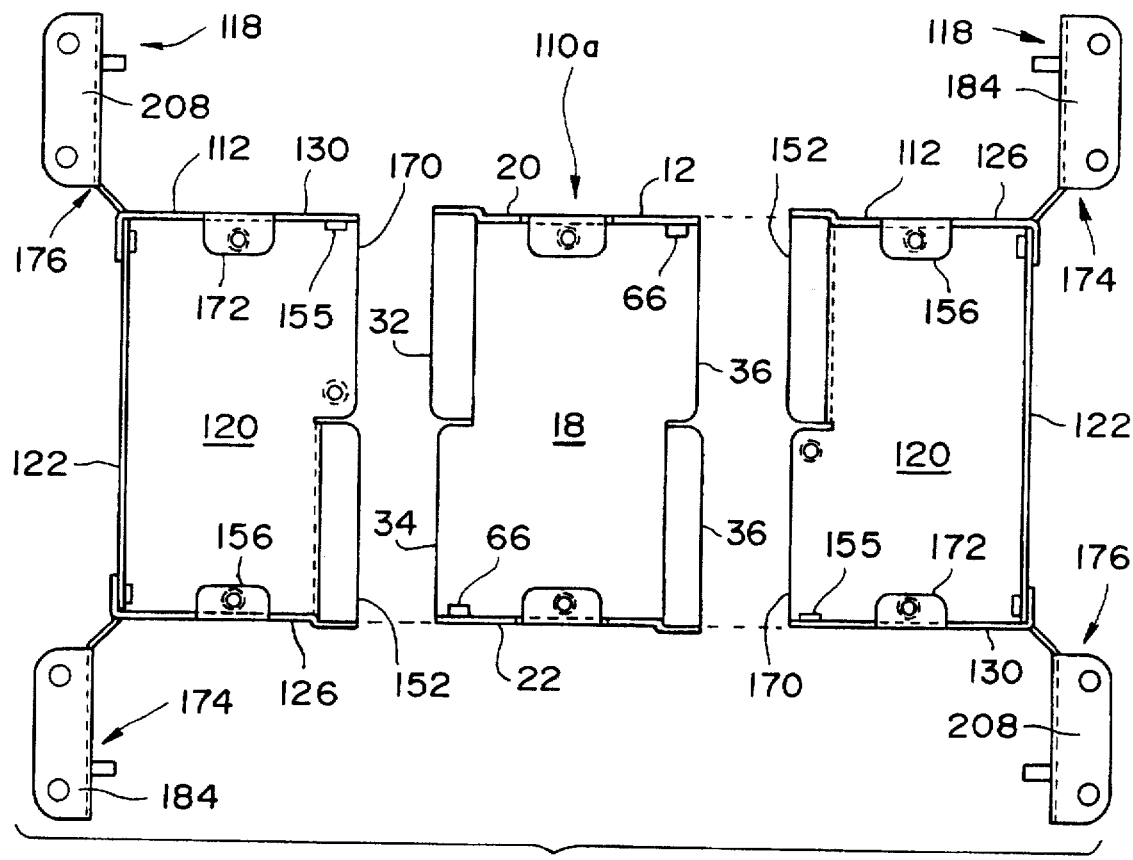
FIG. 16 is an exploded front elevational view of an electrical box using a pair of main bodies with brackets and a main body without a bracket.
Figure 17:
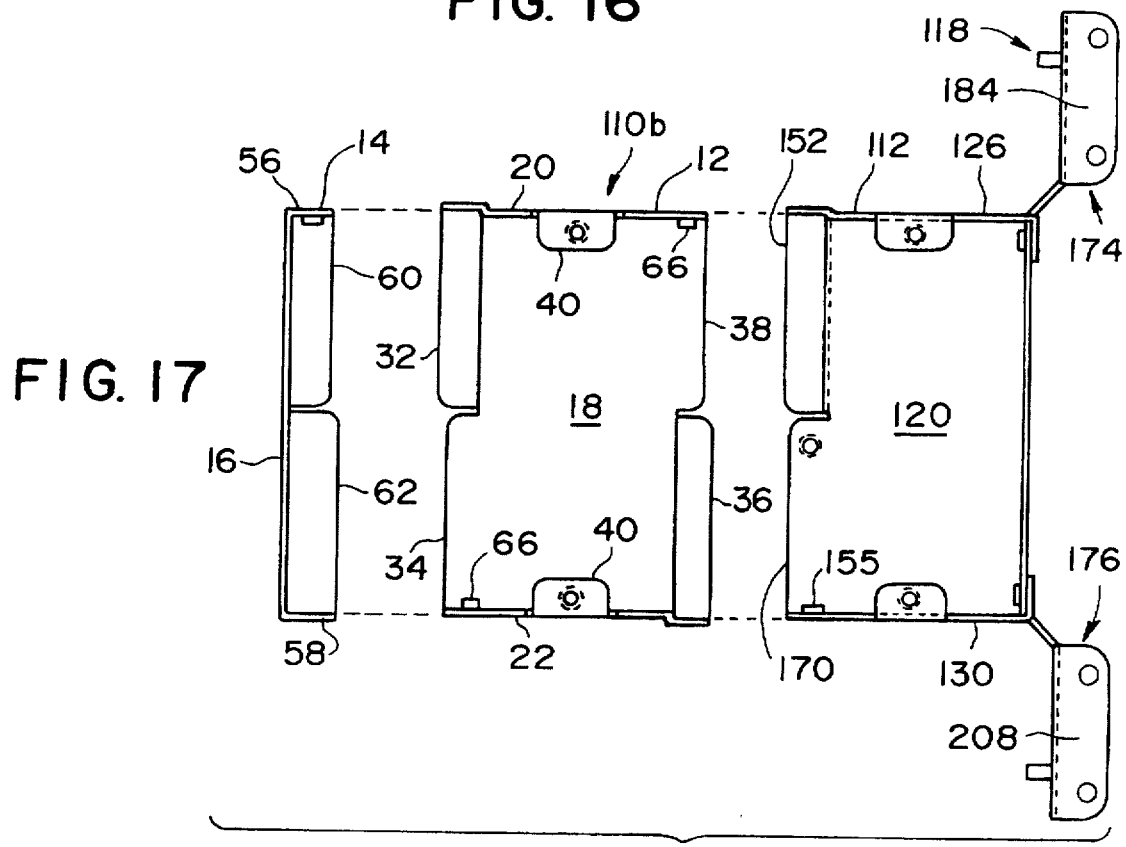
FIG. 17 is an exploded front elevational view of an electrical box using a main body with a bracket, a main body without a bracket and a sidewall.

Referring to FIGS. 16 and 17, a pair of electrical boxes 110a and 110b are illustrated in accordance with the present invention. In particular, electrical box 110a is constructed using a pair of main bodies 112 with brackets 118 and a main body 12 with plaster ears 41 removed. Main bodies 112 are coupled to main body 12 in substantially the same manner in which sidewalls 14 are coupled to main body 12 in the embodiment of FIG. 1. Accordingly, the assembly of electrical box 110a will not be discussed or illustrated herein.

Electrical box 110b is constructed using a main body 112, a main body 12 with plaster ears 41 removed and a sidewall 14. The assembly of main body 112 to main body 12 is substantially the same as the assembly of a sidewall 14 to a main body 12 as discussed above. Accordingly, the assembly of electrical box 110b will not be discussed or illustrated herein.

Figure 18:
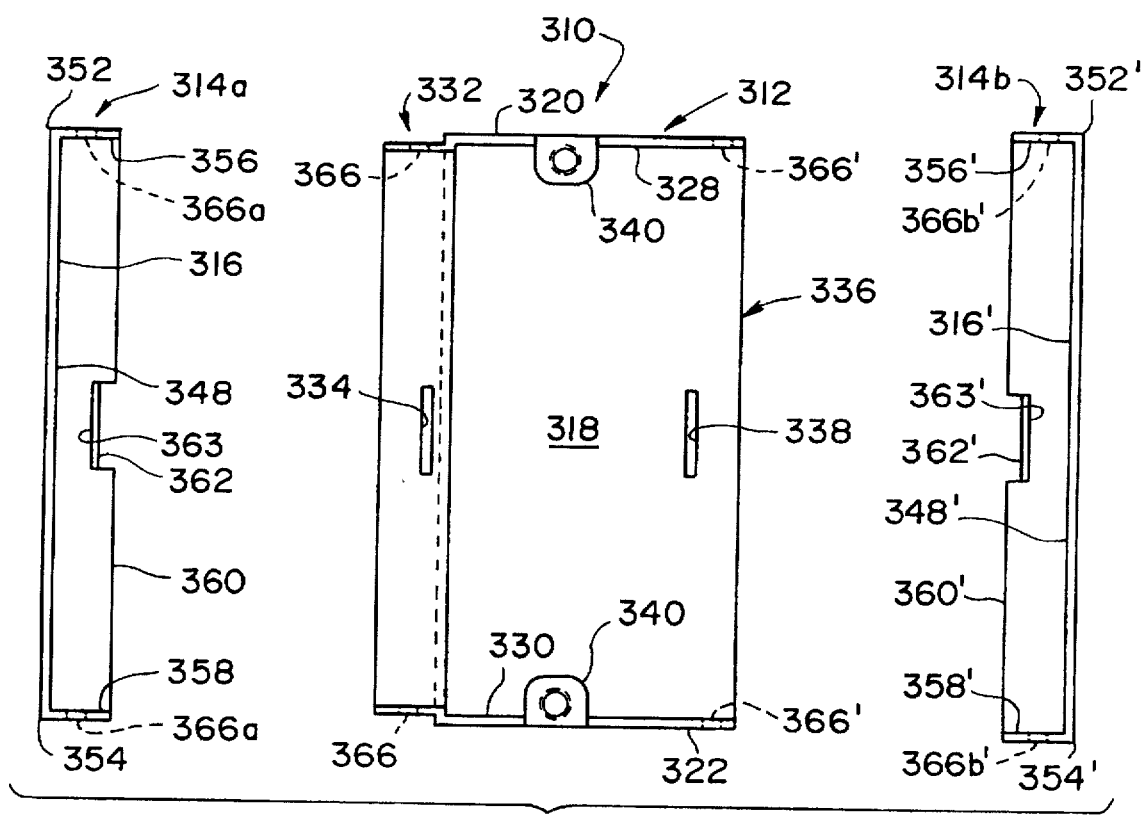
FIG. 18 is an exploded front elevational view of an electrical box in a further embodiment showing a main body and a pair of sidewalls.
Figure 19:
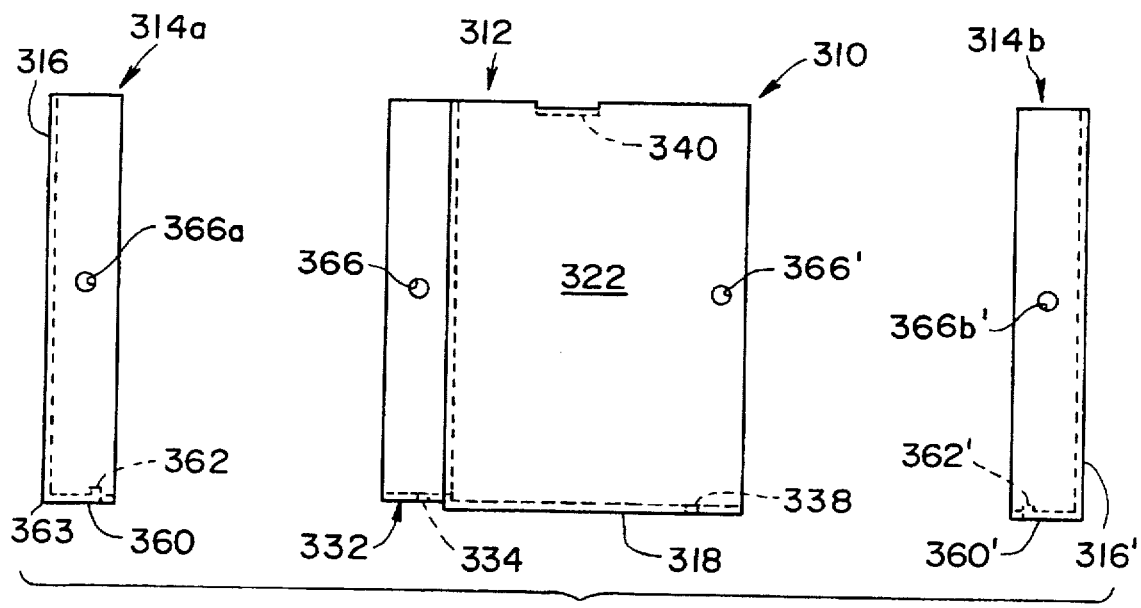
FIG. 19 is an exploded, bottom end plan view of the electrical box of FIG. 18.

Embodiment of FIGS. 18 and 19

Referring to FIGS. 18 and 19, a further embodiment of an electrical box 310 in accordance with the present invention includes a main body 312 and a pair of sidewalls 314a and 314b. Main body 312 is formed from a folded blank of sheet material to define a rear wall or panel 318, top end panel 320 coupled to rear panel 318 along fold line 328 and extending perpendicular to rear panel 318, and bottom end panel 322 coupled to rear panel 318 along fold line 330 and extending perpendicular to rear panel 318. Electrical device mounting tabs 340 depend from top end panel 320 and bottom end panel 322, respectively. A continuous first flange 332 extends from the left side of main body 312 as viewed in FIG. 18. Flange 332 extends the full length of top end panel 320, along rear panel 318, and along bottom end panel 322. As shown in FIG. 19, flange 332 is offset inwardly from the plane of rear panel 318, top end panel 320 and bottom end panel 322 by a distance substantially equal to the thickness of the sheet material. A slot 334 is disposed in flange 332 as shown in FIG. 18. A second flange 336 is defined along the right side edge of main body 312 opposite flange 332 as viewed in FIG. 18. A slot 338 is formed in flange 336.

Sidewall 314a is formed from a folded blank of sheet material to define a side panel 316. A first flange 356 is coupled to side panel 316 along fold line 352 to extend perpendicular thereto. A second flange 358 extends perpendicular to side panel 316 and is coupled thereto by fold line 354. A third flange 360 extends perpendicular to side panel 316 and is coupled thereto along fold line 348. An interlocking tab 362 extends perpendicular from flange 360 and is coupled thereto by fold line 363. Tab 362 is dimensioned to mate with slot 334 when sidewall 314 is coupled to main body 312.

Sidewall 314b is substantially the same as sidewall 314a, except that sidewall 314b is larger in height and width than sidewall 314a. Thus, similar elements are identified by like reference numbers with the addition of a prime. Sidewall 314b includes a side panel 316′, a first flange 356′ coupled thereto by fold line 352′, second flange 358′ coupled to side panel 316′ along fold line 354′, and third flange 360′ coupled to side panel 316' by fold line 348'. Each of the flanges 356',358' and 360' extends perpendicular to side panel 316'. Flange 360' includes an interlocking tab 362' coupled thereto by fold line 363'.

The electrical box 310 is assembled by coupling sidewalls 314a and 314b to main body 312 so that the corresponding flanges overlap and interlocking tabs 362 and 362' interlock with slots 334 and 338, respectively. In the embodiment illustrated, a plurality of optionally threaded holes 366, 366a, 366' and 366b' are provided in the flanges for receiving screws (not shown) as previously discussed.

In the embodiment of FIGS. 18 and 19, sidewall 314b is dimensioned so that flanges 356',358' and 360' overlap flange 336 along the outside surface of main body 312. The flanges 356,358 and 360 of sidewall 314a nest in the recess defined by offset flange 332. Tabs 362 and 362' are received in slots 334 and 338, respectively. In this fashion, the outside surfaces of the electrical box 312 are substantially smooth since the outer surfaces of sidewall 314a lie in the same plane as the outer surfaces of main body 312. In the embodiment of FIGS. 18 and 19, the flanges 356',358' and 360' of sidewall 314b are dimensioned to nest outside main body 312. Of course, the flanges 356',358' and 360' and sidewall 314b may be dimensioned to overlap the inside surface of main body 312 to provide a substantially smooth outer surface.

Figures 20, 22:
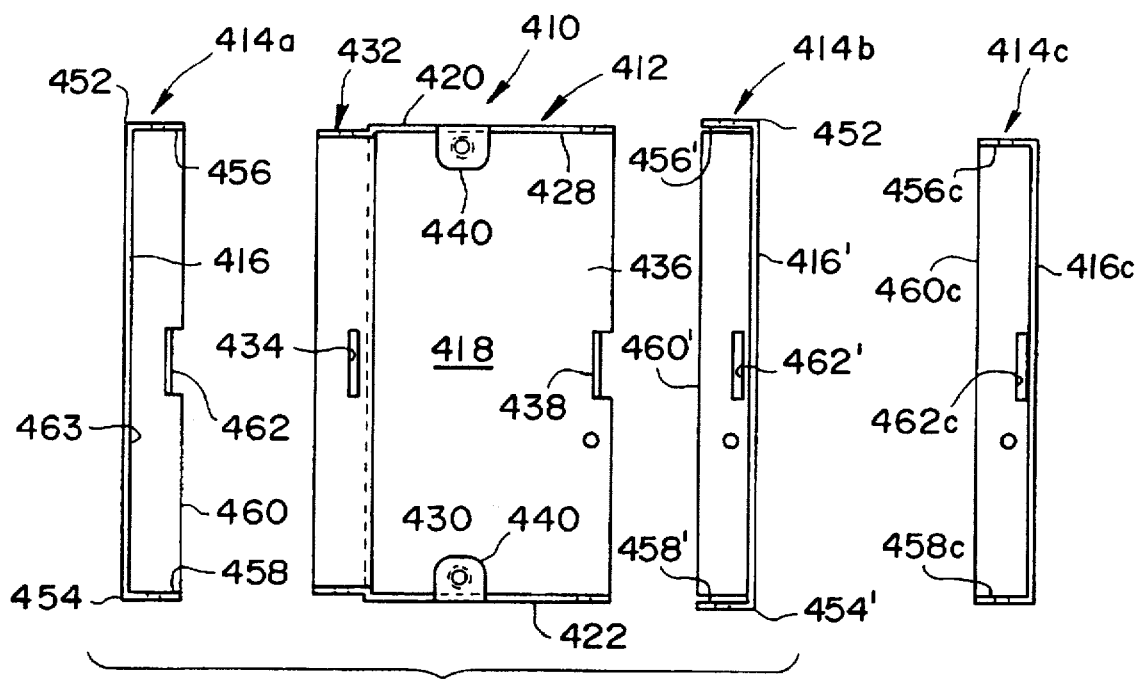
FIG. 20 is an exploded front elevational view of an electrical box in accordance with a further embodiment of the present invention showing a main body and a pair of sidewalls.
FIG. 22 is a front elevational view of a sidewall in accordance with a further embodiment of the present invention for use with the electrical box of FIG. 20 and in place of the right sidewall.
Figures 21, 23:
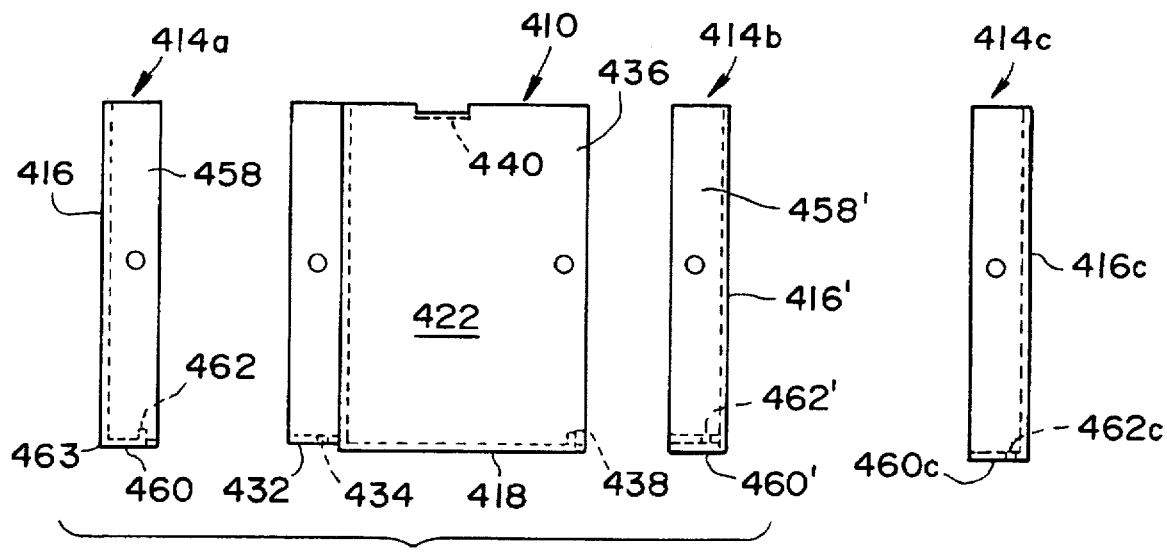
FIG. 21 is an exploded bottom end plan view of the electrical box of FIG. 20.
FIG. 23 is a bottom end plan view of the sidewall illustrated in FIG. 22.

Embodiment of FIGS. 20 and 21

Referring now to the embodiment illustrated in FIGS. 20 and 21, an electrical box 410 is illustrated. Electrical box 410 is substantially identical to electrical box 310, except for modifications to the coupling of main body 412 and sidewall 414b. More specifically, sidewall 414b is similar to sidewall 314b of FIG. 18, except for flanges 456' and 458' being spaced from third flange 460' by a distance substantially equal to the thickness of the sheet material forming main body 412 so that flanges 456' and 458' overlap flange 436 along the outside surface of main body 414, and a slot 462' being formed in flange 460' of sidewall 414b for receiving an interlocking tab 438 formed in flange 436 of main body 412.

Flange 460' is dimensioned to fit inside of flange 436 along rear panel 418. End flanges 456' and 458' are coupled to side panel 416' by fold line 452' and 454', respectively. Fold lines 452' and 454' are spaced from the ends of flange 460' by a distance equal to the thickness of the sheet material from which main body 412 is made. The spacing between flanges 456' and 458' and flange 460' allows flanges 456' and 458' to overlap on the outside surface of flange 436 of main body 412 while allowing flange 460' to fit inside of flange 436 of main body 412.

In this illustrated embodiment, flange 460' includes a slot 462' to receive a tab 438 projecting inwardly from flange 436 on main body 412. As in the previous embodiments, main body 412 includes flange 432 for coupling with sidewall 414a or another main body 412 via screws.

Sidewall 414c of FIGS. 22 and 23

Referring to FIGS. 22 and 23, a modified sidewall 414c is illustrated for use with electrical box 410 of the embodiment of FIG. 20. In particular, sidewall 414c can be used instead of sidewall 414b in constructing electrical box 410. Sidewall 414c is substantially identical to sidewall 414b, except that sidewall 414c has been modified to fit inside of flange 436 of main body 410. In other words, side panel 416c and third flange 460c are shorter in height than side panel 416' and third flange 460' of sidewall 416b. Also, slot 462c has been moved closer to side panel 416c. Since sidewall 414c is substantially similar to sidewall 414b, sidewall 414c will not be discussed in detail. In this embodiment, the outer surface of the assembly is smooth since end wall 414c is nested within the flange 436 of main body 410.

Figure 24:
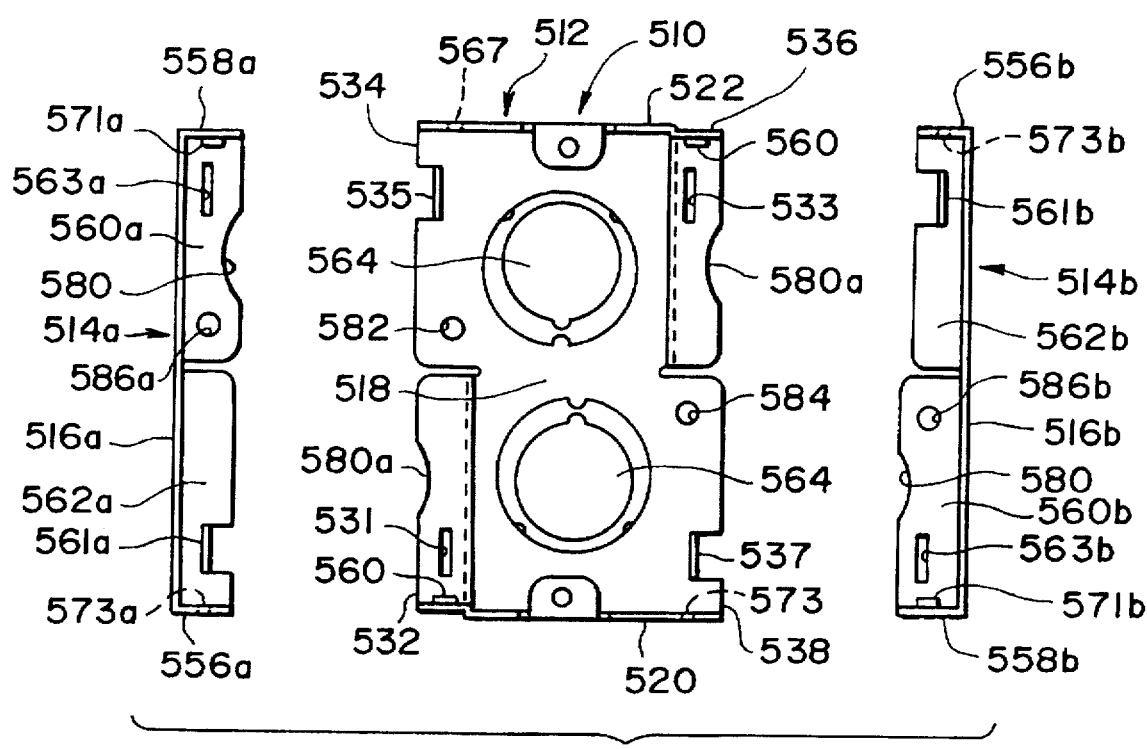
FIG. 24 is a front elevational view of an electrical box in accordance with a further embodiment of the present invention showing a main body and a pair of sidewalls.

Embodiment of FIG. 24

Referring to FIG. 24, a modified electrical box 510 is illustrated. Electrical box 510 is substantially identical to electrical box 10 shown in FIG. 2, except for the modifications to the coupling of main body 512 to sidewalls 514a and 514b. More specifically, main body 512 and sidewalls 514a and 514b are provided with an interlocking tab and slot arrangement. Main body 512 includes a pair of flanges 532 and 536 on opposite sides of main body 512 and are offset inwardly from the plane of rear panel 518 and end panels 520 and 522 by a distance equal to the thickness of the sheet material. Interlocking slots 531 and 533 are provided in flanges 532 and 536, respectively. Flanges 534 and 538 are provided on opposite sides of main body 512 opposite flanges 532 and 536. Flanges 534 and 538 are positioned in the same plane as rear panel 518 and end panels 522 and 520, respectively. Interlocking tabs 535 and 537 are provided in flanges 534 and 538, respectively. Flanges 532 and 536 also include extruded holes 560 to receive a threaded screw (not shown) to fixedly couple the sidewalls 514a and 514b to main body 512.

Sidewalls 514a and 514b are identical and interchangeable. Sidewall 514a is formed from a folded blank of sheet material to define a side panel 516a, a pair of end flanges 556a and 558a extending perpendicular to side panel 516a, and a pair of side flanges 560a and 562a extending perpendicular to side panel 516a and end flanges 556a and 558a.

Flange 562a is substantially parallel to flange 560a and offset outwardly a distance substantially equal to the thickness of the sheet material of main body 512. Flange 562a includes an inwardly extending tab 561a dimensioned to engage slot 531 in flange 532 of main body 512.

Flange 558a includes an extruded hole 571a to receive a threaded screw. Flange 556a includes a punched hole 573a to allow a screw (not shown) to pass through. Sidewall 514b is identical to sidewall 514a such that identical components are identified by the same reference number with the addition of the letter b. Thus, the construction of sidewall 514b will not be discussed in detail herein.

The electrical box 510 is assembled as in the previous embodiments by coupling sidewalls 514a and 514b to main body 512 so that the corresponding flanges overlap and interlocking tabs 535 and 537 of main body interlock with slots 563a and 563b, respectively. Interlocking tabs 561a and 561b also interlock with slots 531 and 533 of main body 512. Screws (not shown) are passed through the punched holes 567 and 573a in flanges 534 and 556a, respectively, and threaded into extruded holes 571a and 560 in flanges 558a and 532, respectively.

In the embodiment of FIG. 24, sidewalls 514a and 514b are dimensioned so that flanges 556a and 556b fit outside offset flanges 532 and 536 so that flanges 556a and 556b lie substantially flush with end panels 520 and 522. Flanges 558a and 558b are dimensioned to fit inside flanges 534 and 538 to provide a substantially smooth outer surface.

Rear panel 518 includes optional knock-outs or pry-outs 564. Flanges 560a and 560b, include an arcuate shaped notch 580 to prevent the flanges from interfering with cables or cable couplings passing through the knock-out opening. Similar notches 580a are provided in flanges 532 and 536 of main body 512 so that the flanges do not interfere with a cable coupling in the knock-out opening when two or more main bodies are coupled together.

Flange 534 and 538 of main body 510 include punched holes 582 and 584, respectively. Flanges 560a and 560b of sidewalls 514a and 514b include punch holes 586a and 586b to align with holes 582 and 584 when assembled. A self-threading ground screw (not shown) is installed through the holes. The overlapping flanges provide a double thickness of material to ensure two full threads of engagement for the ground screw.

Figure 25:
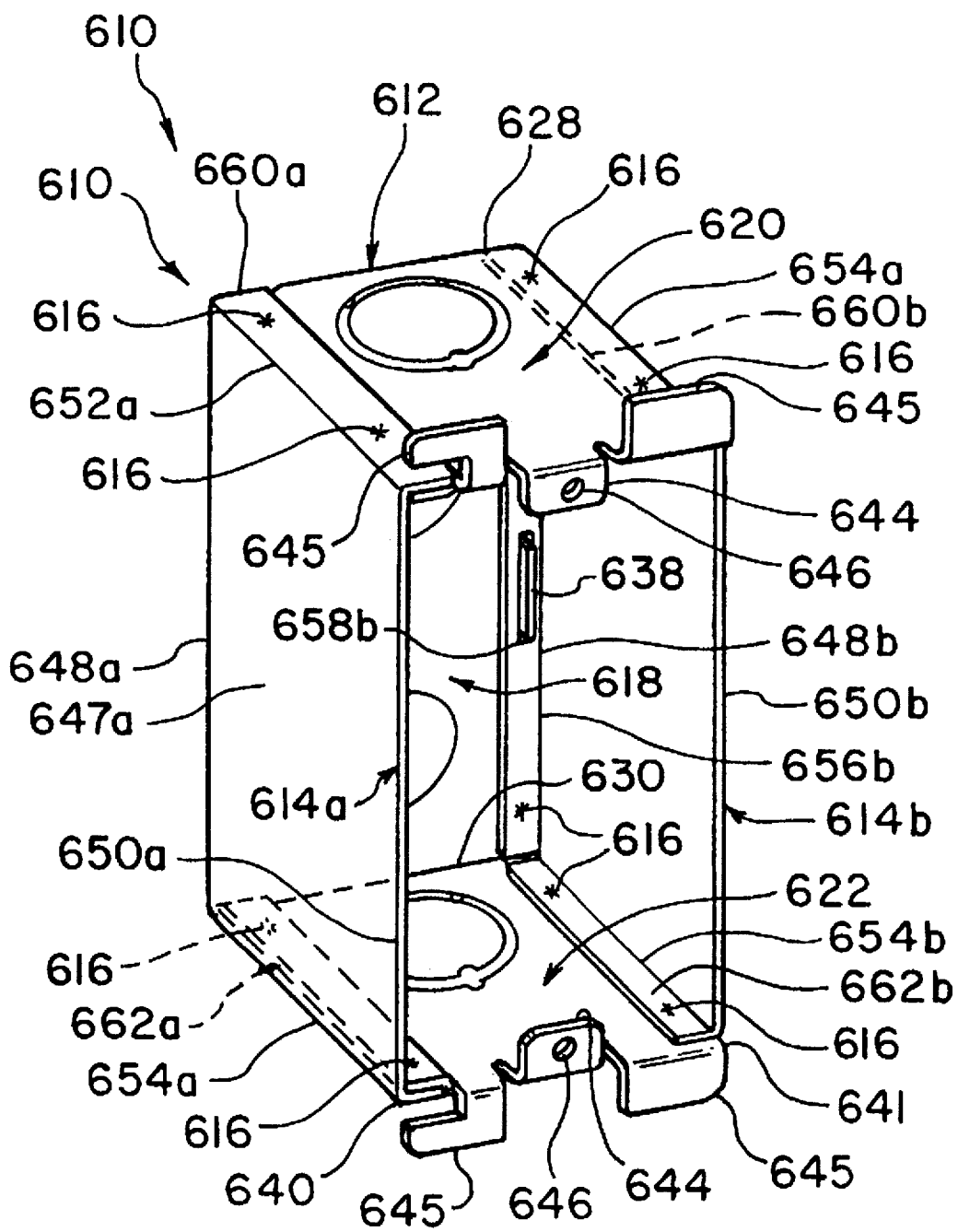
FIG. 25 is a front perspective view of an electrical box in accordance with a non-ganged embodiment of the present invention.
Figure 26:
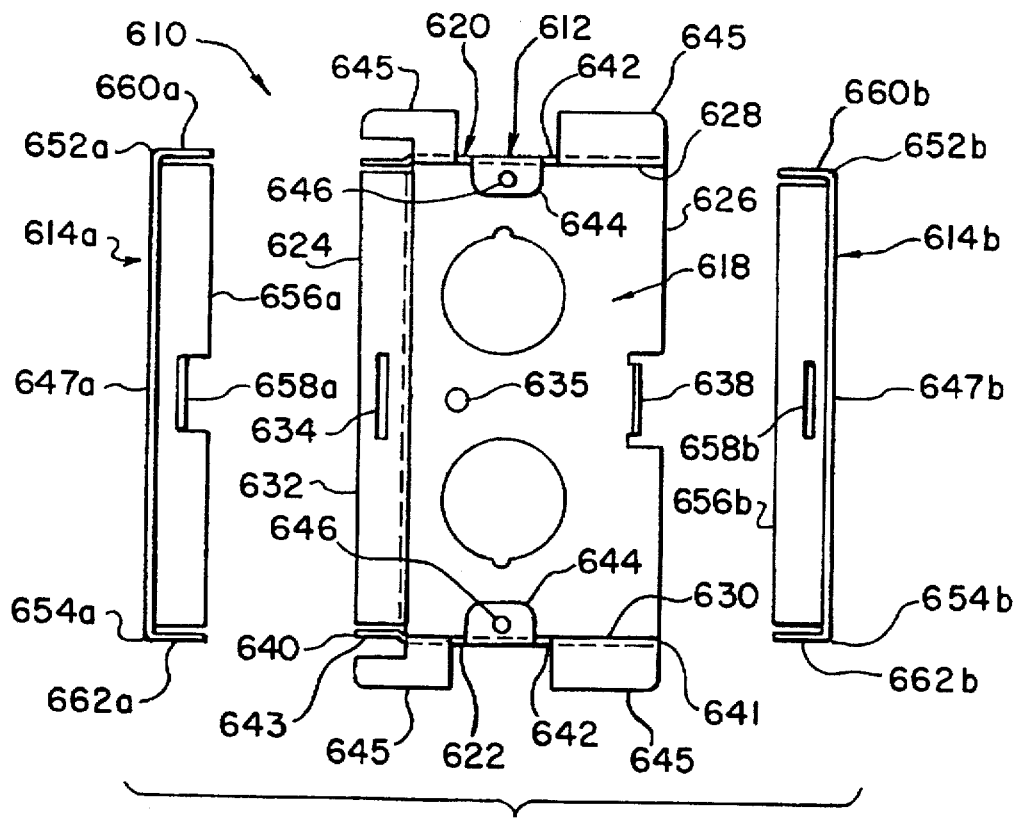
FIG. 26 is an exploded front elevational view of the non-gangable electrical box illustrated in FIG. 25.
Figure 27:
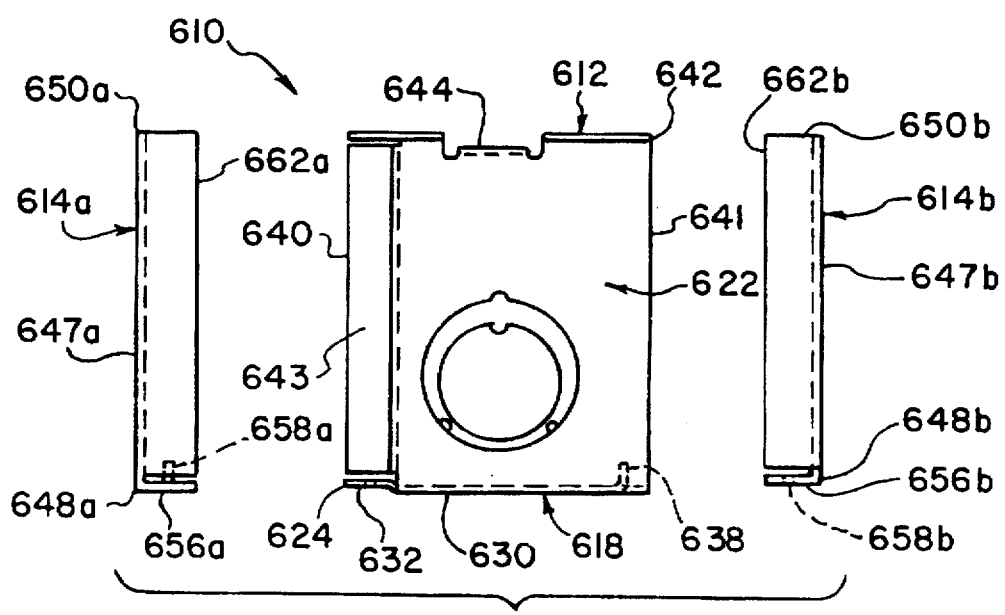
FIG. 27 is an exploded bottom elevational view of the non-gangable electrical box illustrated in FIGS. 25 and 26.

Embodiment of FIGS. 25–27

Referring now to FIGS. 25–27, a non-gangable electrical box 610 in accordance with a further embodiment of the present invention is illustrated. Electrical box 610 includes a main body 612 and a pair of sidewalls 614a and 614b rigidly and fixedly coupled to main body 612 by welds 616. Welds 616 are illustrated as spot welds. However, sidewalls 614a and 614b can be modified to include projections, which touch main body 612, such that when a high electrical current is applied to electrical box 610, the projections melt to weld sidewalls 614a and 614b to main body 612.

Electrical box 610 is similar to the previously discussed embodiments, except that this embodiment is non-gangable. In other words, once box 610 is welded it cannot be easily transformed from a single gang box to a multiple gang box. Of course, by using several main bodies 612, a welded multiple gang box can be formed. Due to its unique construction, main body 612 and sidewalls 614a and 614b of electrical box 610 can be used for constructing gangable boxes with only minor modifications, i.e., adding screw holes for screws. In other words, manufacture costs can be minimized by using this construction, since the tooling for non-gangable boxes and gangable boxes would be virtually identical. Furthermore, this embodiment also allows for forming a two gang welded box, a three gang welded box, etc. That is, it is advantageous to couple several bodies together and then weld the assembly together. Thus, multiple gang boxes, i.e., two gang, three gang, etc. boxes, can be formed, which are not gangable due to their welds. The overlapping flanges (discussed below) are advantages for welding main bodies to each other.

Main body 612 and sidewalls 614a and 614b are each preferably formed by folding a unitary, one-piece blank of sheet material. Due to the unique folding pattern of electrical box 610, the sheet material used for main body 612 and sidewalls 614a and 614b can be thinner than the sheet material used for conventional electrical boxes. In particular, the blank of sheet materials used for electrical box 610 preferably has a thickness of about 0.034" to about 0.039", while conventional electrical boxes have a thickness of about 0.0625". Also, a plurality of conventional break-out windows and/or auxiliary holes can be stamped into the blanks of sheet material for the main body 612 and the sidewalls 614a and 614b as needed or desired.

As seen in FIG. 25, main body 612 is formed by folding a blank of sheet material to define a rear wall or panel 618, a top end wall or panel 620 coupled to rear panel 618 along fold line 628 to extend perpendicular to rear panel 618, and a bottom end wall or panel 622 coupled to rear panel 618 along fold line 630 to extend perpendicular to rear wall panel 618. Accordingly, main body 612 is substantially U-shaped. Main body 612 can be welded to other main bodies 612 to form a multiple gang box (not shown) by merely removing a portion of tabs 645 and then spot welding the edges.

As seen in FIG. 26, rear panel 618 is substantially rectangular and has a pair of opposite side edges 624 and 626 and a pair of transverse end edges formed by fold lines 628 and 630. Side edge 624 is bent to form an offset flange 632 which extends substantially the entire length of rear panel 618. Preferably, flange 632 is offset inwardly from the plane of the rear panel 618 by a distance substantially equal to the thickness of the sheet material used in constructing electrical box 610. Flange 632 includes a coupling slot 634 for engaging a part of sidewall 614a as discussed below.

Rear wall panel 618 also includes a grounding hole 635 for receiving a grounding screw (not shown) for grounding an electrical device (not shown) to be installed in electrical box 610 thereto. Hole 635 can be prethreaded or threaded by a self-tapping ground screw as needed or desired.

Midway along side edge 626 of rear panel 618 is a locking tab 638 for engaging sidewall 614b. Locking tab 638 extends substantially perpendicular to rear panel 618. Specifically, locking tab 638 is bent along a fold line towards the front opening of the electrical box 610.

Referring now to the end panels, top end panel 620 and bottom end panel 622 are substantially identical, except that top end panel 620 is a mirror image of bottom end panel 622. Accordingly, the same reference numerals will be used to indicate identical or substantially identical parts of top and bottom end panels 620 and 622.

Each of the end panels 620 and 622 has a pair of side edges 640 and 641 extending substantially perpendicularly from rear wall panel 618 to an end edge 642. Accordingly, end panels 620 and 622 are substantially rectangular. Side edges 640 of end panels 620 and 622 are each bent to form an offset portion or flange 643 which is adapted to be welded to a portion of sidewall 614a as discussed below. Flanges 643 are offset from the plane of the remainder of end panels 620 and 622 by a distance substantially equal to the thickness of the sheet material used in constructing electrical box 610.

Along end edges 642 of end panels 620 and 622 are mounting tabs 644 and plaster ears 645 which are coupled thereto by fold lines. Specifically, each of the end panels 620 and 622 has a single mounting tab 644 extending inwardly towards the center of electrical box 610 for mounting an electrical device (not shown) to electrical box 610. More specifically, each mounting tab 644 is provided with a threaded hole 646 for receiving a screw of an electrical device to secure the electrical device to electrical box 610. The plaster ears 645 extend substantially perpendicular to end panels 620 and 622 in the opposition direction from mounting tabs 644, i.e., outwardly from electrical box 610.

Sidewall 614a is substantially rectangular, and has a side panel 647a with rear longitudinal side edge 648a, a front longitudinal side edge 650a, a top transverse end edge 652a extending between edges 648a and 650a, and a bottom transverse end edge 654a extending between edges 648a and 650a. A side coupling flange 656a is formed along rear edge 648a for engaging and exteriorly overlapping the outside surface of coupling flange 632 of main body 612. Preferably, coupling flange 656a is spot welded to coupling flange 632 of main body 612 in two places, e.g., about 0.25 inch to about 0.50 inch from each corner of sidewall 614a, by welds 616. Coupling flange 656a extends substantially perpendicular to side panel 647a, and includes a centrally located locking tab 658a.

Locking tab 658a extends substantially perpendicular to coupling flange 656a and substantially parallel to side panel 647a. Locking tab 658a engages slot 634 of main body 612. This arrangement helps to align the parts together for welding. Of course, since sidewall 614a is welded to main body 612, locking tab 658a of sidewall 614a and coupling slot 634 of main body 612 can be eliminated if desired. However, from a manufacturing standpoint, this non-gangable box can be used to form a ganged electrical box if not welded together, but screwed together. Accordingly, it is desirable from a manufacturing standpoint to have the non-gangable boxes formed substantially identical to the gangable boxes so as to reduce manufacturing costs as discussed above. The overlapping area provides strength to the box as well as a place to weld the parts together.

A top end coupling flange 660a extends substantially perpendicular from top edge 652a, while a bottom end coupling flange 662a extends substantially perpendicular from bottom edge 654a of side panel 647a. Coupling flanges 660a and 662a are substantially identical and exteriorly overlap the outside surfaces of coupling flanges 643 of end panels 620 and 622, respectively, of main body 612. Coupling flanges 660a and 662a are preferably spot welded in two places to end panels 620 and 622 for rigidly coupling and non-removably securing the sidewall 614a to main body 612.

Sidewall 614b is substantially rectangular, and has a side panel 647b with rear longitudinal edge 648b, a front longitudinal edge 650b, a top transverse edge 652b extending between edges 648b and 650b, and a bottom transverse edge 654b extending between edges 648b and 650b. A side coupling flange 656b is formed along rear edge 648b for engaging and interiorly overlapping the inside surface of rear panel 618 along side edge 626. Coupling flange 656b extends substantially perpendicular to side panel 647b, and includes a centrally located locking slot 658b. Locking slot 658b engages locking tab 638 of rear panel 618 of main body 612. This arrangement helps to align the parts for welding. Of course, since sidewall 614b is welded to main body 612, locking slot 658b of sidewall 614b and locking tab 638 can be eliminated if desired. However, from a manufacturing standpoint, this non-gangable box can be used to form a ganged electrical box if not welded together, but screwed together. Accordingly, it is desirable from a manufacturing standpoint to have the non-gangable boxes formed substantially identical to the gangable boxes so as to reduce manufacturing costs as discussed above. The overlapping area provides strength to the box as well as a place to weld the parts together.

A top end coupling flange 660b extends substantially perpendicular from top edge 652b, while a bottom end coupling flange 662b extends substantially perpendicular from bottom edge 654b of side panel 647b. Coupling flanges 660b and 662b are substantially identical and interiorly overlap the inside surface of end panels 620 and 622 along side edges 641. Coupling flanges 660b and 662b are preferably spot welded in two places to end panels 620 and 622 by welds 616 for rigidly coupling and non-removably securing the sidewall 614b to main body 612.

Figure 28:
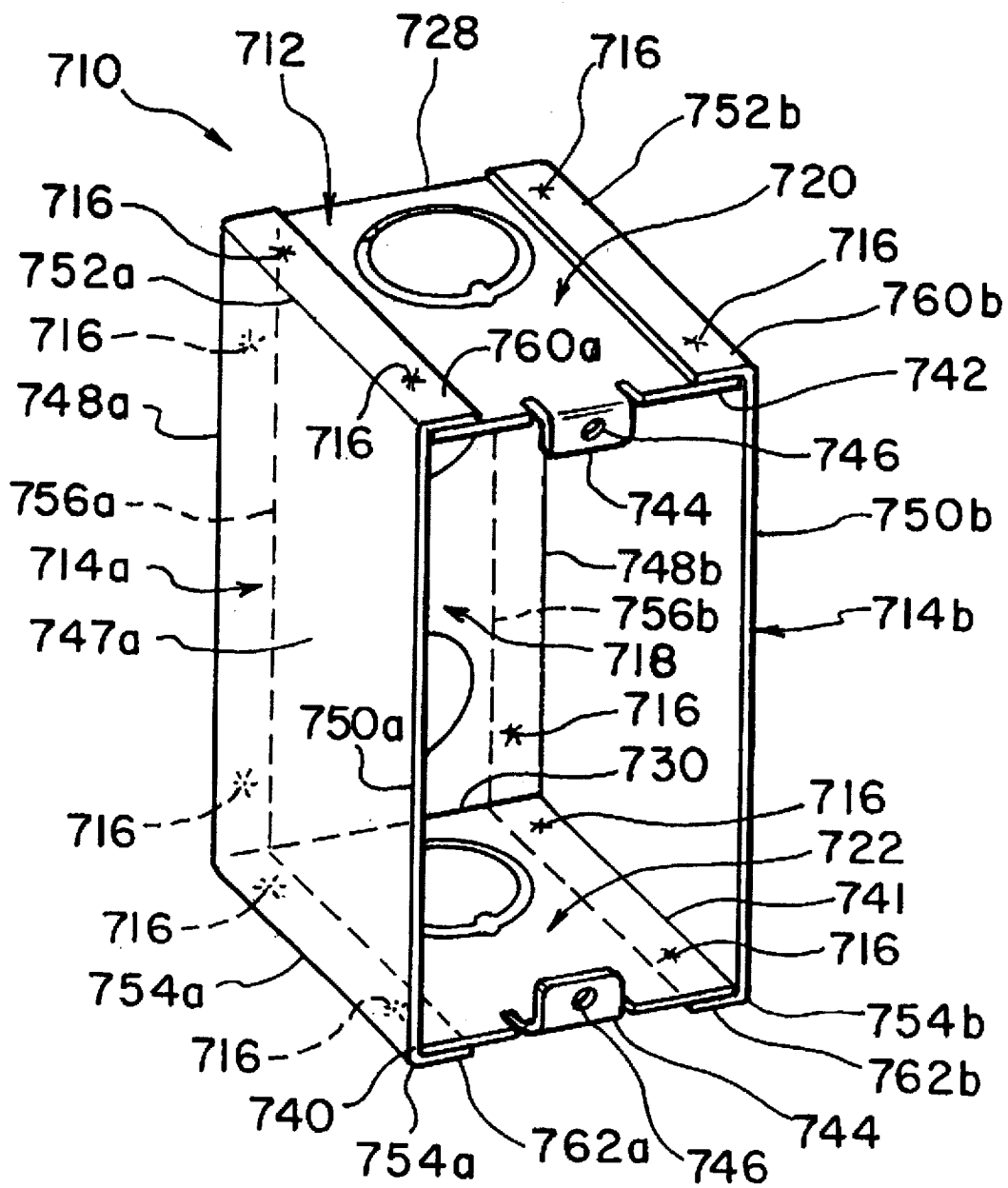
FIG. 28 is a front perspective view of an electrical box in accordance with another non-ganged embodiment of the present invention.
Figure 29:
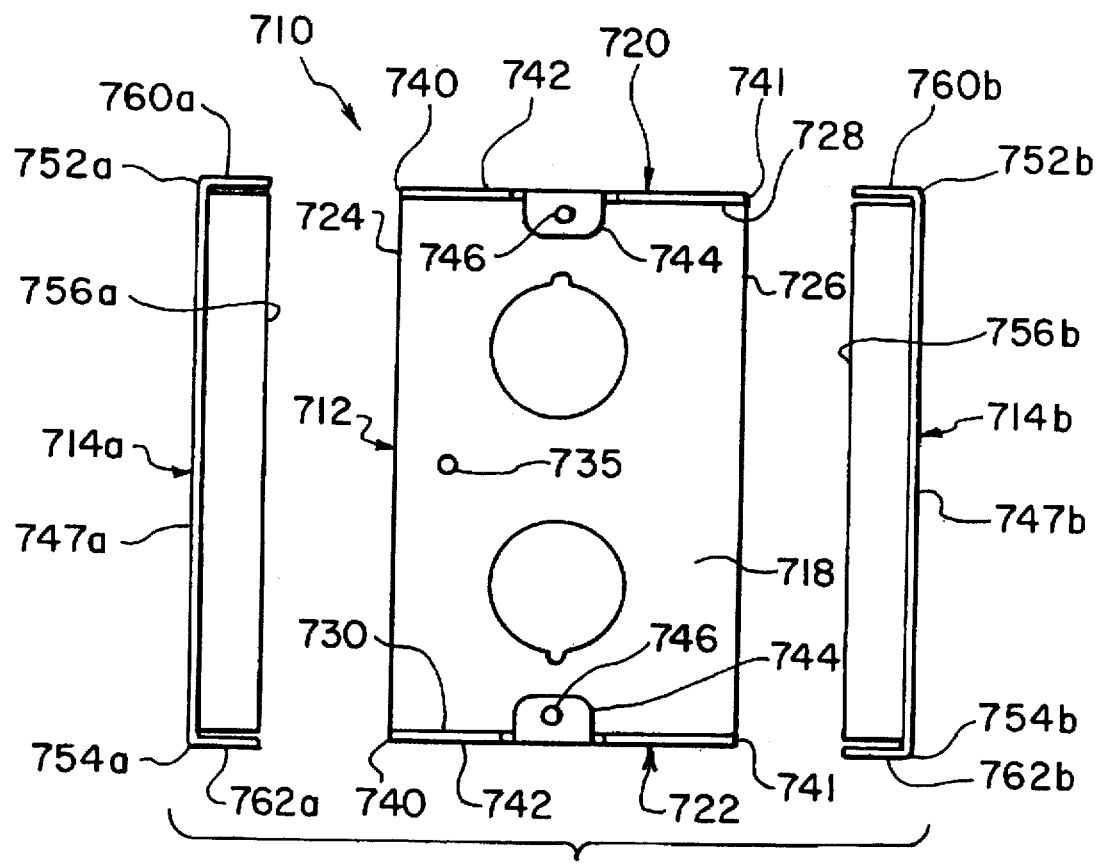
FIG. 29 is an exploded front elevational view of the non-gangable electrical box illustrated in FIG. 28.
Figure 30:
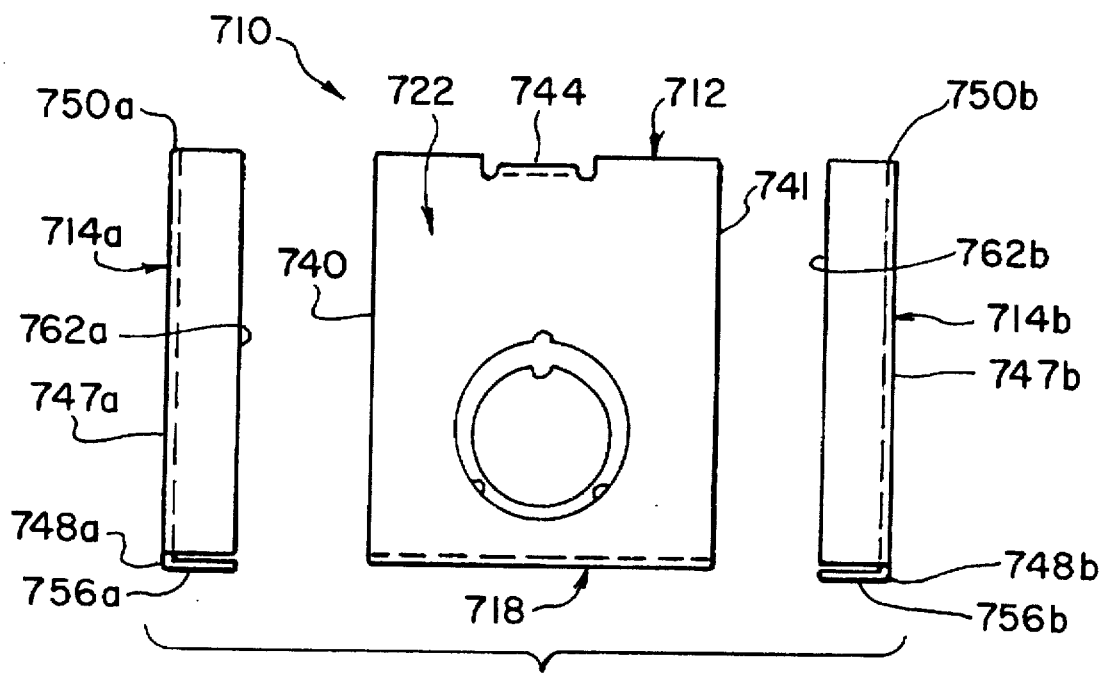
FIG. 30 is an exploded bottom elevational view of the non-gangable electrical box illustrated in FIGS. 28 and 29.

Embodiment of FIGS. 28–30

Referring now to FIGS. 28–30, a non-gangable electrical box 710 in accordance with a further embodiment of the present invention is illustrated. Electrical box 710 includes a main body 712 and a pair of sidewalls 714a and 714b rigidly and fixedly coupled to main body 712 by welds 716. Welds 716 are illustrated as spot welds. However, sidewalls 714a and 714b can be modified to include projections, which touch main body 712, such that when a high electrical current is applied to electrical box 710, the projections melt to weld sidewalls 714a and 714b to main body 712. Electrical box 710 is similar to the previously discussed embodiments, except that this embodiment is non-gangable.

Main body 712 and sidewalls 714a and 714b are each preferably formed by folding a unitary, one-piece blank of sheet material. Due to the unique folding pattern of electrical box 710, the sheet material used for main body 712 and sidewalls 714a and 714b can be thinner than the sheet material used for conventional electrical boxes. In particular, the blank of sheet materials used for electrical box 710 preferably has a thickness of about 0.034" to about 0.039", while conventional electrical boxes have a thickness of about 0.0625". Also, a plurality of conventional break-out windows and/or auxiliary holes can be stamped into the blanks of sheet material for the main body 712 and the sidewalls 714a and 714b as needed or desired.

As seen in FIG. 28, main body 712 is formed by folding a blank of sheet material to define a rear wall or panel 718, a top end wall or panel 720 coupled to rear panel 718 along fold line 728 to extend perpendicular to rear panel 718, and a bottom end wall or panel 722 coupled to rear panel 718 along fold line 730 to extend perpendicular to rear wall panel 718. Accordingly, main body 712 is substantially U-shaped.

As seen in FIG. 29, rear panel 718 is substantially rectangular and has a pair of opposite side edges 724 and 726 and a pair of transverse end edges formed by fold lines 728 and 730. Rear wall panel 718 also includes a threaded grounding hole 735 for receiving a grounding screw (not shown) for grounding an electrical device (not shown) to be installed in electrical box 710 thereto.

Referring now to the end panels, top end panel 720 and bottom end panel 722 are substantially identical, except that top end panel 720 is a mirror image of bottom end panel 722. Accordingly, the same reference numerals will be used to indicate identical or substantially identical parts of top and bottom end panels 720 and 722.

Each of the end panels 720 and 722 has a pair of side edges 740 and 741 extending substantially perpendicularly from rear wall panel 718 to an end edge 742. Accordingly, end panels 720 and 722 are substantially rectangular.

Along end edges 742 of end panels 720 and 722 are mounting tabs 744 which are coupled thereto by fold lines. Specifically, each of the end panels 720 and 722 has a single mounting tab 744 extending inwardly towards the center of electrical box 710 for mounting an electrical device (not shown) to electrical box 710. More specifically, each mounting tab 744 is provided with a threaded hole 746 for receiving a screw of an electrical device to secure the electrical device to electrical box 710. Plaster ears could be added to electrical box 710 in the same manner as the immediately preceding embodiment. Specifically, plaster ears can extend substantially perpendicular to end panels 720 and 722 in the opposition direction from mounting tabs 744, i.e., outwardly from electrical box 710, and shaped in substantially the same manner as in the immediately preceding embodiment.

Sidewall 714a is substantially rectangular, and has a side panel 747a with rear longitudinal side edge 748a, a front longitudinal side edge 750a, a top transverse end edge 752a extending between edges 748a and 750a, and a bottom transverse end edge 754a extending between edges 748a and 750a. A side coupling flange 756a is formed along rear edge 748a for engaging and exteriorly overlapping the outside surface of side edge 724 of main body 712. Preferably, coupling flange 756a is spot welded to rear panel 718 of main body 712 in two places, e.g., about 0.25 inch to about 0.50 inch from each corner of sidewall 714a by welds 716. Coupling flange 756a extends substantially perpendicular to side panel 747a.

A top end coupling flange 760a extends substantially perpendicular from top edge 752a, while a bottom end coupling flange 762a extends substantially perpendicular from bottom edge 754a of side panel 747a. Coupling flanges 760a and 762a are substantially identical and exteriorly overlap the outside surfaces of end panels 720 and 722, respectively, along side edges 740. Coupling flanges 760a and 762a are preferably spot welded in two places to end panels 720 and 722 by welds 716 for rigidly coupling and non-removably securing the sidewall 714a to main body 712.

Sidewall 714b is substantially rectangular, and has a side panel 747b with rear longitudinal edge 748b, a front longitudinal edge 750b, a top transverse edge 752b extending between edges 748b and 750b, and a bottom transverse edge 754b extending between edges 748b and 750b. A side coupling flange 756b is formed along rear edge 748b for engaging and exteriorly overlapping the outside surface of rear panel 718 along side edge 726. Coupling flange 756b extends substantially perpendicular to side panel 747b.

A top end coupling flange 760b extends substantially perpendicular from top edge 752b, while a bottom end coupling flange 762b extends substantially perpendicular from bottom edge 754b of side panel 747b. Coupling flanges 760b and 762b are substantially identical and exteriorly overlap the outside surfaces of end panels 720 and 722 along side edges 741. Coupling flanges 760b and 762b are preferably spot welded in two places to end panels 720 and 722 by welds 716 for rigidly coupling and non-removably securing the sidewall 714b to main body 712.

The embodiments discussed above are preferred embodiments of the invention although numerous variations can be made. For example, in the illustrated embodiments, the coupling flanges extend the full length of the side of the sidewall and main body. Alternatively, the flanges extend only partially the length of the sides a sufficient distance to ensure tight assembly of the components. The flanges on the rear panel 18 in the embodiment of FIGS. 1–11 are split so that they fit over and under the complementary flanges of the sidewall. This split assists in making a more secure assembly. The flanges of the top and bottom end panels may also be split if desired. The slot and tab arrangement of FIGS. 20–23 can be used in place of one or more of the fasteners on any of the flanges.

In a further embodiment, a ground screw may extend through the overlapping flanges to secure the components of the assembly together as well as providing a ground connection to the assembly.

While several advantageous embodiments have been used to illustrate the invention, it will be understood by those skilled in the art that various changes and modifications of the invention can be made without departing from the scope of the invention as defined in the following claims.

What is claimed is:

1. An electrical box assembly, comprising:

a metallic U-shaped member including a substantially rectangular rear panel with first and second end edges and first and second side edges, a first substantially rectangular end panel having first and second end edges and first and second side edges with said first end edge of said first end panel being rigidly coupled to said first end edge of said rear panel and extending substantially perpendicular to said rear panel, and a second substantially rectangular end panel having first and second end edges and first and second side edges with said first end edge of said second end panel rigidly coupled to said second end edge of said rear panel and extending substantially perpendicular to said rear panel;

a first metallic sidewall including a first side panel with first and second end edges and first and second side edges, and being rigidly coupled to said U-shaped member, each of said first and second end edges of said first side panel having a substantially planar first end coupling flange extending substantially perpendicular to said first side panel from a first end fold line and a second end fold line, respectively, for overlapping a substantially planar portion of one of said end panels to attach said first sidewall to said U-shaped member; and a second metallic sidewall including a second side panel with first and second end edges and first and second side edges, and being rigidly coupled to said U-shaped member, each of said first and second end edges of said second side panel having a second end coupling flange extending substantially perpendicular to said second side panel for overlapping a portion of one of said end panels of said U-shaped member to attach said second sidewall to said U-shaped member, one of said side edges of said first sidewall having a first side coupling flange extending substantially perpendicular to said first side panel for overlapping a portion of said first side edge of said rear panel, and one of said side edges of said second sidewall having a second side coupling flange extending substantially perpendicular to said second side panel for overlapping a portion of said second side edge of said rear panel.

2. An electrical box assembly according to claim 1, wherein said first side edges of said rear panel and said end panels are offset from the planes of said rear panel and said end panels, respectively, for accommodating said side and end coupling flanges of said first sidewall, respectively.

3. An electrical box assembly according to claim 2, wherein said first side edges of said rear panel and said end panels are offset inwardly from the planes of said rear panel and said end panels, respectively, such that said side and end coupling flanges of said first sidewall overlap exterior portions of said first side edges of said rear panel and said end panels.

4. An electrical box assembly according to claim 1, wherein said first end coupling flanges of said first sidewall are spaced apart relative to said first side edges of said first and second end panels for exteriorly overlapping said first side edges of said first and second end panels.

5. An electrical box assembly according to claim 4, wherein said second end coupling flanges of said second sidewall are spaced apart relative to said second side edges of said first and second end panels for interiorly overlapping said second side edges of said first and second end panels.

6. An electrical box assembly according to claim 5, wherein said first side coupling flange of said first sidewall is positioned to exteriorly overlap said first side edge of said rear panel.

7. An electrical box assembly according to claim 6, wherein said second side coupling flange of said second sidewall is positioned to interiorly overlap said second side edge of said rear panel.

8. An electrical box assembly according to claim 4, wherein said second end coupling flanges of said second sidewall are spaced apart relative to said second side edges of said first and second end panels for exteriorly overlapping said second side edges of said first and second end panels.

9. An electrical box assembly according to claim 8, wherein
said first side coupling flange of said first sidewall is positioned to exteriorly overlap said first side edge of said rear panel.

10. An electrical box assembly according to claim 9, wherein
said second side coupling flange of said second sidewall is positioned to exteriorly overlap said second side edge of said rear panel.

11. An electrical box assembly, comprising:
a U-shaped member including a substantially rectangular rear panel with first and second end edges and first and second side edges, a first substantially rectangular end panel having first and second end edges and first and second side edges with said first end edge of said first end panel being rigidly coupled to said first end edge of said rear panel and extending substantially perpendicular to said rear panel, and a second substantially rectangular end panel having first and second end edges and first and second side edges with said first end edge of said second end panel rigidly coupled to said second end edge of said rear panel and extending substantially perpendicular to said rear panel;
a first sidewall including a first side panel with first and second end edges and first and second side edges, and being rigidly coupled to said U-shaped member, each of said first and second end edges of said first side panel having a first end coupling flange extending substantially perpendicular to said first side panel for overlapping a portion of one of said end panels to attach said first sidewall to said U-shaped member; and
a second sidewall including a second side panel with first and second end edges and first and second side edges, and being rigidly coupled to said U-shaped member, each of said first and second end edges of said second side panel having a second end coupling flange extending substantially perpendicular to said second side panel for overlapping a portion of one of said end panels of said U-shaped member to attach said second sidewall to said U-shaped member, and
each of said first end coupling flanges of said first sidewall and each of said second end coupling flanges of said second sidewall being welded to one of said end panels.

12. An electrical box assembly, comprising:
a U-shaped member including a substantially rectangular rear panel with first and second end edges and first and second side edges, a first substantially rectangular end panel having first and second end edges and first and second side edges with said first end edge of said first end panel being rigidly coupled to said first end edge of said rear panel and extending substantially perpendicular to said rear panel, and a second substantially rectangular end panel having first and second end edges and first and second side edges with said first end edge of said second end panel rigidly coupled to said second end edge of said rear panel and extending substantially perpendicular to said rear panel;
a first sidewall including a first side panel with first and second end edges and first and second side edges, and being rigidly coupled to said U-shaped member, each of said first and second end edges of said first side panel having a first end coupling flange extending substantially perpendicular to said first side panel for overlapping a portion of one of said end panels to attach said first sidewall to said U-shaped member; and
a second sidewall including a second side panel with first and second end edges and first and second side edges, and being rigidly coupled to said U-shaped member, each of said first and second end edges of said second side panel having a second end coupling flange extending substantially perpendicular to said second side panel for overlapping a portion of one of said end panels of said U-shaped member to attach said second sidewall to said U-shaped member,
said first end coupling flanges of said first sidewall being spaced apart relative to said first side edges of said first and second end panels for exteriorly overlapping said first side edges of said first and second end panels,
said second end coupling flanges of said second sidewall being spaced apart relative to said second side edges of said first and second end panels for interiorly overlapping said second side edges of said first and second end panels,
one of said side edges of said first sidewall having a first side coupling flange extending substantially perpendicular to said first side panel for overlapping a portion of said first side edge of said rear panel, and
one of said side edges of said second sidewall having a second side coupling flange extending substantially perpendicular to said second side panel for overlapping a portion of said second side edge of said rear panel,
said first side coupling flange of said first sidewall being positioned to exteriorly overlap said first side edge of said rear panel,
said second side coupling flange of said second sidewall being positioned to interiorly overlap said second side edge of said rear panel, and
each of said first end coupling flanges of said first sidewall and each of said second end coupling flanges of said second sidewall being welded to one of said end panels.

13. An electrical box assembly according to claim 12, wherein
said first and second side coupling flanges of said first and second sidewalls, respectively, are welded to said first and second side edges of said rear panel, respectively.

14. An electrical box assembly according to claim 13, wherein
said first side coupling flange of said first sidewall is interlocked with said first side edge of said rear panel by a first locking tab and first slot arrangement formed therebetween.

15. An electrical box assembly according to claim 14, wherein
said second side coupling flange of said second sidewall is interlocked with said second side edge of said rear panel by a second locking tab and second slot arrangement formed therebetween.

16. An electrical box assembly according to claim 15, wherein
said first locking tab is formed on said first side coupling flange, and said first slot is formed in said rear panel.

17. An electrical box assembly according to claim 16, wherein
said second locking tab is formed on said rear panel and said second slot is formed in said second side coupling flange.

18. An electrical box assembly according to claim 15, wherein
said second locking tab is formed on said rear panel and said second slot is formed in said second side coupling flange.

19. An electrical box assembly, comprising:

a U-shaped member including a substantially rectangular rear panel with first and second end edges and first and second side edges, a first substantially rectangular end panel having first and second end edges and first and second side edges with said first end edge of said first end panel being rigidly coupled to said first end edge of said rear panel and extending substantially perpendicular to said rear panel, and a second substantially rectangular end panel having first and second end edges and first and second side edges with said first end edge of said second end panel rigidly coupled to said second end edge of said rear panel and extending substantially perpendicular to said rear panel;

a first sidewall including a first side panel with first and second end edges and first and second side edges, and being rigidly coupled to said U-shaped member, each of said first and second end edges of said first side panel having a first end coupling flange extending substantially perpendicular to said first side panel for overlapping a portion of one of said end panels to attach said first sidewall to said U-shaped member; and a second sidewall including a second side panel with first and second end edges and first and second side edges, and being rigidly coupled to said U-shaped member, each of said first and second end edges of said second side panel having a second end coupling flange extending substantially perpendicular to said second side panel for overlapping a portion of one of said end panels of said U-shaped member to attach said second sidewall to said U-shaped member, and each of said second end edges of said first and second end panels having at least one plaster ear integrally coupled thereto by a first fold line and a mounting tab with a hole integrally coupled thereto by a second fold line.

20. An electrical box assembly, comprising:

a U-shaped member including a substantially rectangular rear panel with first and second end edges and first and second side edges, a first substantially rectangular end panel having first and second end edges and first and second side edges with said first end edge of said first end panel being rigidly coupled to said first end edge of said rear panel and extending substantially perpendicular to said rear panel, and a second substantially rectangular end panel having first and second end edges and first and second side edges with said first end edge of said second end panel rigidly coupled to said second end edge of said rear panel and extending substantially perpendicular to said rear panel;

a first sidewall including a first side panel with first and second end edges and first and second side edges, and being rigidly coupled to said U-shaped member, each of said first and second end edges of said first side panel having a first end coupling flange extending substantially perpendicular to said first side panel for overlapping a portion of one of said end panels to attach said first sidewall to said U-shaped member; and a second sidewall including a second side panel with first and second end edges and first and second side edges, and being rigidly coupled to said U-shaped member, each of said first and second end edges of said second side panel having a second end coupling flange extending substantially perpendicular to said second side panel for overlapping a portion of one of said end panels of said U-shaped member to attach said second sidewall to said U-shaped member, said first end coupling flanges of said first sidewall being spaced apart relative to said first side edges of said first and second end panels for exteriorly overlapping said first side edges of said first and second end panels, said second end coupling flanges of said second sidewall being spaced apart relative to said second side edges of said first and second end panels for exteriorly overlapping said second side edges of said first and second end panels, one of said side edges of said first sidewall having a first side coupling flange extending substantially perpendicular to said first side panel for overlapping a portion of said first side edge of said rear panel, and one of said side edges of said second sidewall having a second side coupling flange extending substantially perpendicular to said second side panel for overlapping a portion of said second side edge of said rear panel, said first side coupling flange of said first sidewall being positioned to exteriorly overlap said first side edge of said rear panel, said second side coupling flange of said second sidewall being positioned to exteriorly overlap said second side edge of said rear panel, and each of said first end coupling flanges of said first sidewall and each of said second end coupling flanges of said second sidewall being welded to one of said end panels.

21. An electrical box assembly according to claim 20, wherein said first and second side coupling flanges of said first and second sidewalls, respectively, are welded to said first and second side edges of said rear panel, respectively.

* * * * *